US009221040B2

(12) United States Patent
Brizius

(10) Patent No.: US 9,221,040 B2
(45) Date of Patent: Dec. 29, 2015

(54) PERFLUOROALKYLATED LIGNIN AS A CATALYST SUPPORT WITH VARYING PHASE BEHAVIOR

(75) Inventor: Glen Leon Brizius, Augusta, GA (US)

(73) Assignee: Empire Technology Development LLC, Wilmington, DE (US)

( * ) Notice: Subject to any disclaimer, the term of this patent is extended or adjusted under 35 U.S.C. 154(b) by 288 days.

(21) Appl. No.: 13/579,485

(22) PCT Filed: Apr. 20, 2012

(86) PCT No.: PCT/US2012/034419
§ 371 (c)(1),
(2), (4) Date: Aug. 16, 2012

(87) PCT Pub. No.: WO2013/158113
PCT Pub. Date: Oct. 24, 2013

(65) Prior Publication Data
US 2013/0281745 A1 Oct. 24, 2013

(51) Int. Cl.
C07C 17/275 (2006.01)
B01J 31/06 (2006.01)
C07G 1/00 (2011.01)

(52) U.S. Cl.
CPC . B01J 31/06 (2013.01); C07G 1/00 (2013.01); B01J 2231/40 (2013.01)

(58) Field of Classification Search
None
See application file for complete search history.

(56) References Cited

U.S. PATENT DOCUMENTS

| 6,815,390 B2 | 11/2004 | Vaughan et al. |
| 2003/0148878 A1 | 8/2003 | Vaughan et al. |
| 2009/0078913 A1 | 3/2009 | Luque et al. |

FOREIGN PATENT DOCUMENTS

| AU | 8574001 A | 1/2002 |
| EP | 1307287 A2 | 5/2003 |
| EP | 2007675 A2 | 12/2008 |
| JP | 2004502528 A | 1/2004 |
| WO | WO 02/04120 A2 | 1/2002 |
| WO | WO2007/104798 A2 | 9/2007 |

OTHER PUBLICATIONS

Zheng et al. (Chinese Journal of Organic Chemistry, 29(12), 1983-1987, 2009).*
International Search Report and Written Opinion for PCT/US2012/034419 dated Jul. 12, 2012.
Ackermann et al., Transition-Metal-Catalyzed Direct Arylation of (Hetero)Arenes by C—H Bond Cleavage, *Angewandte Chemie International Edition*, (Dec. 8, 2009), 48(52):9792-9826 (Abastract).
Alberico et al., Aryl-Aryl Bond Formation by Transition-Metal-Catalyzed Direct Arylation, *Chem. Rev.* (Jan. 10, 2007), 107:174-238.
Aleklett, The Autumn Agenda for ASPO International's President, (Jul. 2, 2012) http://www.peakoil.net/.
Anderson, et al., The Selective Reaction of Aryl Halides with KOH: Synthesis of Phenols, Aromatic Ethers, and Benzofurans, *J. Am. Chem. Soc.* (Aug. 1, 2006), 128(33):10694-10695 (Abstract).
Biofuels Basics, http://www.nrel.gov/learning/re_biofuels.html [Printed from Internet Jul. 27, 2012].
Biomass: Pryolysis Chemistry: Difficulties http://blogs.princeton.edu/chm333/f2006/biomass/2007/01/pryrolysis_chemistry.html [Printed from Internet Jul. 27, 2012].
Biorefineries, Bioenergy and Energy Planning Research Group BPE, Techno-economical and environmental evaluation of lignocellulosic biorefineries, http://bpe.epfl.ch/page34016-en.html [Printed from Internet Jul. 27, 2012].
Bringezu et al., Towards sustainable production and use of resources: Assessing Biofuels, International Panel for Sustainable Resource Management, United Nations Environment Programme, (2009).
Chen et al., Palladium(II)-Catalyzed C—H Activation/C—C Cross-Coupling Reactions: Versatility and Practicality, *Angewandte Chemie International Edition* (Jun. 25, 2009), 48(28):5094-5115 (Abstract).
Clousier et al., Catalytic materials based on catalysts containing ionic liquid phase supported on chitosan or alginate: Importance of the support, *Comptes Rendus Chimie* (Jul. 16, 2010), 14(7-8):680-684 (Abstract).
Curran et al., Tris(2-(perfluorohexyl)ethyl)tin Hydride: A New Fluorous Reagent for Use in Traditional Organic Synthesis and Liquid Phase Combinatorial Synthesis, *J. am. Chem. Soc.* (Mar. 13, 1996), 118(10):2531-2532 (Abstract).
Daugulis et al., Palladium- and Copper-Catalyzed Arylation of Carbon—Hydrogen Bonds, *Acc Chem Res.* (Aug. 18, 2009), 42(8):1074-1086.
Department of Energy and Climate Change: Report on the risks and impacts of a potential future decline in oil production (Jun. 1, 2009).
Deprez et al., Room Temperature Palladium-Catalyzed 2-Arylation of Indoles, *J. Am Chem. Soc.* (Mar. 24, 2006), 128(15):4972-4973 (Abstract).
Do et al., Copper-Catalyzed Arylation and Alkenylation of Polyfluoroarene C—H Bonds, *J. Am. Chem. Soc.* (Jan. 9, 2008), 130(4):1128-1129 (Abstract).
Do et al., A General Method for Copper-Catalyzed Arylation of Arene C—H Bonds, *J. Am. Chem. Soc.* (Oct. 17, 2008), 130(45):15185-15192 (Abstract).
Dust Explosions (Reade Advanced Materials reviews), http://www.reade.com/Safety/dust.html (Oct. 4, 2005).
Engonga et al., Grafting of perfluoroalkyl chains onto wood using blocked isocyanates, *Journal of Fluorine Chemistry* (Dec. 14, 1999), 101(1):19-25 (Abstract).
Ethanol fuel in Brazil, http://en.wikipedia.org/wiki/Ethanol_fuel_in_Brazil [Printed from Internet Aug. 2, 2012].

(Continued)

Primary Examiner — Yun Qian
(74) Attorney, Agent, or Firm — Pepper Hamilton LLP

(57) ABSTRACT

Multi-phase biopolymer catalyst support systems, methods of synthesizing a biopolymer material for use in a multi-phase biopolymer catalyst support system, and methods for catalyzing reactions with a multi-phase biopolymer catalyst support system are described.

6 Claims, No Drawings

(56) References Cited

OTHER PUBLICATIONS

Freshwater Spills Symposia http://www.epa.gov/emergencies/contents/fss/index.htm [Printed from Internet Jul. 27, 2012].
The Global Dynamics of BioFuels: Potential Supply and Demand for Ethanol and Biodiesel in the Coming Decade, Brazil Institute Special Report, Issue No. 3 (Apr. 2007).
Grubbs et al., Chapter 1.12. Well-Defined Metallocarbenes and Metallocarbynes Supported on Oxide Supports Prepared via Surface Organometallic Chemistry: A Source of Highly Active Alkane, Alkene, and Alkyne Metathesis Catalysts, *Handbook of Metathesis: Catalyst Development* (Mar. 26, 2008) (Abstract).
Guevarra, JCI's Global Study Finds Rising Energy Costs Drive Green Growth, http://www.greenbiz.com/print/43105 (Jun. 16, 2011).
Hachiya et al., Nickel-Catalyzed Direct C—H Arylation and Alkenylation of Heteroarenes with Organosilicon Reagents, *Angewandte Chemie International Edition* (Feb. 24, 2010), 49(12):2202-2205 (Abstract).
Heck et al., Palladium-catalyzed vinylic hydrogen substitution reactions with aryl, benzyl, and styryl halides, *J. Org. Chem.* (Jul. 1972), 37(14):2320-2322 (Abstract).
Holladay et al., Top Value-Added Chemicals from Biomass: vol. II—Results of Screening for Potential Candidates from Biorefinery Lignin, Pacific Northwest National Laboratory (Oct. 2007).
Join et al., Iridium Catalysis for C—H bond Arylation of Heteroarenes with Iodoarenes, *Angewandte Chemie International Edition* (Apr. 7, 2009), 48(20):3644-3647 (Abstract).
Jones et al., Comparative reactivities of hydrocarbon carbon—hydrogen bonds with a transition-metal complex, *Acc. Chem. Res.* (Mar. 1989), 22(3):91-100 (Abstract).
Kakiuchi et al., Catalytic Methods for C—H Bond Functionalization: Application of Organic Synthesis, *Advanced Synthesis & Catalysis* (Sep. 26, 2003), 345(9-10):1077-1101 (Abstract).
Lafrance et al., Catalytic Intermolecular Direct Arylation of Perfluorobenzenes, *J. Am. Chem. Soc.* (Jun. 20, 2006), 128(27):8754-8756 (Abstract).
Lafrance et al., Palladium-Catalyzed Benzene Arylation: Incorporation of Catalytic Pivalic Acid as a Proton Shuttle and a Key Element in Catalyst Design, *J. Am. Chem. Soc.* (Dec. 9, 2006), 128(51):16496-16497 (Abstract).
Lane et al., Direct Palladium-Catalyzed C-2 and C-3 Arylation of Indoles: A Mechanistic Rationale for Regioselectivity, *J. Am. Chem. Soc.* (May 14, 2005), 127(22):8050-8057 (Abstract).
Lebrasseur et al., Room Temperature and Phosphine Free Palladium Catalyzed Direct C-2 Arylation of Indoles, *J. Am. Chem. Soc.* (Feb. 16, 2008), 130(10):2926-2927 (Abstract).
Lewis et al., Direct Functionalization of Nitrogen Heterocycles via Rh-Catalyzed C—H Bond Activation, *Acc. Chem. Res.* (Jul. 11, 2008), 41(8):1013-1025 (Abstract).
Li et al., Recent Advances in Direct Arylation via Palladium-Catalyzed Aromatic C—H Activation, *Synlett* (2008), 2008(7):949-957 (Abstract).
Liu et al., Organocatalysis in Cross-Coupling: DMEDA-Catalyzed Direct C—H Arylation of Unactivated Benzene, *J. Am. Chem. Soc.* (Aug. 2, 2010), 132(47):16737-16740 (Abstract).
Lu et al., Nanoengineering of a Magnetically Separable Hydrogenation Catalysts, *Angewandte Chemie* (Aug. 13, 2004), 116(33):4403-4406 (Abstract).
Lyons et al., Palladium-Catalyzed Ligand-Directed C—H Functionalization Reactions, *Chem. Rev.* (Jan. 15, 2010), 110(2):1147-1169 (Abstract).
McGlacken et al., Recent advances in aryl-aryl bond formation by direct arylation, *chemical Society Reviews* (May 22, 2009), 38:2447-2464 (Abstract).
Milstein et al., A general, selective, and facile method for ketone synthesis from acid chlorides and organotin compounds catalyzed by palladium, *J. Am. Chem. Soc.* (May 1978), 100(11):3636-3638 (Abstract).
Miyaura et al., A new stereospecific cross-coupling by the palladium-catalyzed reaction of 1-alkenylboranes with 1-alkenyl or 1-alkynyl halides, *Tetrahedron Letters* (1979), 20(36):3437-3440(Abstract).

NMR of Lignin: Characterization of Lignin Functionality by NMR, http://www.ipst.gatech.edu/faculty/ragauskas_art/technical_reviews/NMR%20Analysis%20of%20Lignin.pdf [Printed from Internet Jul. 27, 2012].
Oil-Price.Net—Crude Oil Price, http://www.oil-price.net [Printed from Internet Jul. 27, 2012].
Perlack et al., U.S. Department of Energy, Biomass as Feedstock for a Bioenergy and Bioproducts Industry: The Technical Feasibility of a Billion-Ton Annual Supply (Apr. 2005).
Phipps et al., A Meta-Selective Copper-Catalyzed C—H Bond Arylation, *Science* (Mar. 20, 2009), 323(5921):1593-1597 (Abstract).
Qiu et al., New Ligands That Promote Cross-Coupling Reactions between Aryl Halides and Unactivated Arenes, *Org. Lett.* (Jun. 21, 2011), 13(14):3556-3559 (Abstract).
Sengupta, Ion Exchange and Solvent Extraction: A Series of Advances, vol. 18, CRC Press, Taylor & Francis Group, LLC (2007).
Seregin et al., Direct transition metal-catalyzed functionalization of heteroaromatic compounds, *Chemical Society Reviews* (Mar. 5, 2007), 36:1173-1193 (Abstract).
Shirakawa et al., tert-Butoxide-Mediated Arylation of Benzene with Aryl Halides in the Presence of a Catalytic 1,10-Phenanthroline Derivative, *J. Am. Chem. Soc.* (Oct. 20, 2010), 132(44):15537-15539 (Abstract).
Spin-Spin Relaxation Time $T_2$ (transverse): Basic Concepts http://www.chem.queensu.ca/FACILITIES/NMR/nmr/webcourse/t2.htm [Printed from Internet Aug. 2, 2012].
Tarasenko et al., Ionic liquid [BMIM]$PF_6$ as a medium for the selective hydrogenation of 1,4-diacetoxybut-2-yne on the Pd-containing catalysts, *Russian Chemical Bulletin, International Edition* (Jan. 2011), 60(1):179-181.
Thielemans et al., Lignin Esters for Use in Unsaturated Thermosets: Lignin Modification and Solubility Modeling, *Biomacromolecules* (Jun. 7, 2005), 6(4):1895-1905 (Abstract).
Tobisu et al., Nickel-Catalyzed Reaction of Arylzinc Reagents with N-Aromatic Heterocycles: A Straightforward Approach to C—H Bond Arylation of Electron-Deficient Heteroaromatic Compounds, *J. Am. Chem. Soc.* (Aug. 10, 2009), 131(34):12070-12071 (Abstract).
Tamao et al., Selective carbon-carbon bond formation by cross-coupling of Grignard reagents with organic halides. Catalysis by nickel-phosphine complexes, *J. Am. Chem. Soc.* (Jun. 1972), 94(12):4374-4376 (Abstract).
Turner et al., Direct Arylation of Thiazoles on Water, *Angewandte Chemie International Edition* (Sep. 18, 2007), 46(42):7996-8000 (Abstract).
Ullmann et al., Ueber Synthesen in der Biphenylreihe, *Berichte der deutschen chemichen Gesellschaft* (May-Aug. 1901), 34(2):2174-2185 (Abstract).
Vallee et al., Iron-Catalyzed Direct Arylation through an Aryl Radical Transfer Pathway, *J. Am. Chem. Soc.* (Jan. 19, 2010), 132(5):1514-1516 (Abstract).
Wang et al., Versatile Pd(II)-Catalyzed C—H Activation/Aryl-Aryl Coupling of Benzoic and Phenyl Acetic Acids, *J. Am. Chem. Soc.* (Dec. 10, 2008), 130(52):17676-17677 (Abstract).
Yang et al., Ortho Arylation of Acetanilides via Pd(II)-Catalyzed C—H Functionalization, *J. Am. Chem. Soc.* (Apr. 25, 2007), 129(19):6066-6067 (Abstract).
Yoshikai et al., Iron-Catalyzed Chemoselective *ortho* Arylation of Aryl Imines by Directed C—H Bond Activation, *Angewandte Chemie International Edition* (Mar. 17, 2009), 48(16):2925-2928 (Abstract).
Zhao et al., Copper-Catalyzed Direct C Arylation of Heterocycles with Aryl Bromides: Discovery of Fluorescent Core Frameworks, *Angewandte Chemie International Edition* (Mar. 31, 2009), 48(18):3296-3300 (Abstract).
Campeau et al., Recent Advances in Intermolecular Direct Arylation Reactions, *Aldrichimica Acta* (2007), 40(2):35-41.
Mitsunobu et al., Preparation of Esters of Carboxylic and Phosphoric Acid via Quaternary Phosphonium Salts, *Bulletin of the Chemical Society of Japan* (1967), 40(10):2380-2382.
Roy, Pharmaceutical Impurities—A Mini-Review, *AAPS PharmSciTech* (Apr. 10, 2002), 3(2), Article 6, pp. 1-8.

* cited by examiner

PERFLUOROALKYLATED LIGNIN AS A CATALYST SUPPORT WITH VARYING PHASE BEHAVIOR

CROSS-REFERENCE TO RELATED APPLICATIONS

This application is a national phase application under 35 U.S.C. §371 of International Application No. PCT/US2012/034419, filed Apr. 20, 2012 and entitled "PERFLUOROALKYLATED LIGIN AS A CATALYST SUPPORT WITH VARYING PHASE BEHAVIOR," the disclosure of which is incorporated by reference in its entirety and for all purposes.

FIELD

This disclosure relates to a multi-phase biopolymer catalyst support system, methods of synthesizing a biopolymer material and biopolymer catalysts for use in a multi-phase biopolymer catalyst support system and methods for catalyzing reactions with a multi-phase biopolymer catalyst support system. This disclosure also relates to methods of making catalyst support systems as well as their use.

BACKGROUND

Catalysis of synthetic chemical reactions is largely broken down into two broad classes: heterogeneous and homogeneous. Heterogeneous catalysis is where the catalytic material does not dissolve in the reaction medium and the reaction takes place on the surface of a suspended inert solid or packed bed known as a catalyst support. Homogeneous catalysis is where the active catalyst species freely dissolves in the reaction solvent. The latter type of catalysis presents a variety of reaction product purification difficulties as well in separating the homogenous catalyst after completion of the reaction such that the catalyst can be recovered and reused. In some cases, even after extensive purification is performed on the reaction product, traces of a homogenous catalyst may remain, which in some cases may lead to changes in properties of the reaction products that may be detrimental to the desired function of the reaction product. In some instances, the presence of residual amounts of a homogenous catalyst may also hinder characterization of a reaction product. Traditional heterogeneous catalysts may also pose problems. In particular, the reaction substrates and subsequent reaction products may adhere to the catalyst support resulting in lower reaction yields.

Accordingly, more and better ways of catalyzing synthetic chemical reactions that combine the benefits of heterogeneous and homogenous catalysts but lacking their disadvantages are desirable.

SUMMARY

Embodiments herein are directed to multi-phase biopolymer catalyst support systems, methods of synthesizing a biopolymer material for use in a multi-phase biopolymer catalyst support system and methods for catalyzing reactions with a multi-phase biopolymer catalyst support system.

Some embodiments are directed to a multi-phase biopolymer catalyst support system comprising: a functionalized biopolymer; an additive, wherein the additive comprises a catalyst, a ligand, or a combination thereof; an organic solvent phase; and a halogenated solvent phase.

Some embodiments are directed to a method of synthesizing a biopolymer material, the method comprising: dissolving a biopolymer in a non-protic polar solvent to form a dissolved biopolymer; contacting the dissolved biopolymer with a compound of the formula HO—$(CX_2)_n$—$CX_3$, wherein each X is independently selected from F, Br, I, Cl, or combinations thereof; and wherein n is an integer from 2 to 18.

Some embodiments are directed to a method of catalyzing a reaction with a multi-phase biopolymer catalyst support system, the method comprising: covalently coupling an additive with a functionalized biopolymer; combining the functionalized biopolymer covalently coupled to the additive with a halogenated solvent to create a halogenated solvent phase; adding an organic solvent to form an organic solvent phase, wherein the organic solvent phase and halogenated solvent phase are immiscible at ambient temperature and pressure; providing a plurality of reaction substrates for the reaction, wherein the reaction substrates are contained in the organic phase; heating the system for a duration of time for the reaction to proceed to a desired yield of reaction product; separating the organic solvent phase from the halogenated solvent phase to obtain the reaction product at the desired yield.

DETAILED DESCRIPTION

Embodiments herein are directed to a multi-phase biopolymer catalyst support system, methods of synthesizing a biopolymer material and biopolymer catalysts for use in a multi-phase biopolymer catalyst support system and methods for catalyzing reactions with a multi-phase biopolymer catalyst support system.

Some embodiments are directed to a multi-phase biopolymer catalyst support system comprising: a functionalized biopolymer; an additive, wherein the additive comprises a catalyst, a ligand, or a combination thereof; an organic solvent phase; and a halogenated solvent phase.

In some embodiments, the multi-phase biopolymer catalyst support system allows for the sequestration of a ligand or catalyst from the reaction substrate prior to initiating the reaction. In some embodiments, the multi-phase biopolymer catalyst support system allows for the separation of a ligand or catalyst from a reaction product following completion of a reaction. In some embodiments, this is achieved by manipulation of the temperature of the multi-phase biopolymer catalyst support system wherein raising the temperature of the system results in the catalyst coming into contact with the reaction substrates. In some embodiments, lowering the temperature of the multi-phase biopolymer catalyst support system results in separation of the catalyst from any remaining reaction substrates and the reaction products.

In some embodiments, this is achieved because at ambient temperature, or from about 20° C. to about 25° C., and at a pressure, about 100 kPa, the halogenated solvent phase is immiscible with the organic solvent phase. In some embodiments, when the temperature of the system is raised, the halogenated phase and the organic solvent phase form a homogenous phase.

In some embodiments, at ambient temperature and pressure, the reaction substrates are contained in the solvent phase and the biopolymer catalyst support is contained in the halogenated phase. In some embodiments, at ambient temperature and pressure, the halogenated solvent phase and the organic solvent phase exist as a heterogeneous two liquid mixture and when heated go entirely into solution as a single phase. In some embodiments, this can be achieved by raising the temperature to above 80° C. In some embodiments, the miscibility of the halogenated solvent phase and the organic solvent phase when heated is facilitated by mixing the system. Upon cooling, the halogenated solvent and the organic solvent self-separate into distinct immiscible halogenated solvent phase and the organic solvent phase.

When the homogenous phase is formed, the reaction substrates in the organic solvent phase and the catalyst in the halogenated solvent phase come into contact and the reaction may proceed to the desired yield or result. In some embodiments, once the desired yield or result is achieved, the system is cooled to ambient temperature and the organic solvent phase and halogenated solvent phase become immiscible. In some embodiments, this results in separation of the reaction products from the biopolymer catalyst support and recycling of the biopolymer catalyst support.

In some embodiments, following completion of the reaction, the reaction product is contained in the organic solvent phase and the additive is contained in the halogenated solvent phase allowing for their separation and the reuse of the additive.

In some embodiments, the additive is covalently attached to the functionalized biopolymer to allow for additive sequestration in the halogenated phase. In some embodiments, that additive is a ligand or catalyst. In some embodiments, a ligand or catalyst is covalently attached to the functionalized biopolymer to allow for ligand or catalyst sequestration in the halogenated phase at ambient temperature and pressure. In some embodiments, a combination of a catalyst and a ligand are covalently attached to the functionalized biopolymer to allow for catalyst and ligand sequestration in the halogenated phase at ambient temperature and pressure. In some embodiments, the functionalized biopolymer has an affinity for the halogenated phase at ambient temperature and pressure. In some embodiments, this permits the sequestration of any ligand or catalyst in the halogenated phase at ambient temperature and pressure.

In some embodiments, the functionalized biopolymer is selected from the group consisting of lignin, cellulose, hemicellulose, dextrin, a wood-derived biopolymer, and a combination thereof. In some embodiments, the biopolymer comprises a large natural polymer containing numerous aromatic moieties and hydroxyl groups, extensively cross-linked by ether bonds.

In some embodiments the biopolymer is lignin. In some embodiments, lignin has a large number of primary and secondary hydroxyl functional groups along with significant aromatic character, aldehydes and carboxylic acids. Lignin is a highly cross-linked, heavily aromatic, polymeric product that has little value to these industries and, as such, is treated as a waste material.

In some embodiments, the functionalized biopolymer is a powder. In some embodiments, the functionalized biopolymer is a superfine powder. In some embodiments, the functionalized biopolymer is a microcrystalline powder. In some embodiments, the functionalized biopolymer is a superfine powder with a larger surface area. In some embodiments, a larger surface area is defined as greater than about 1 square meter per gram.

As used herein, "microcrystalline" is intended to mean a material comprising crystals visible only under a light microscope. In some embodiments, a microcrystalline material comprises crystals up to 10 microns in length.

In some embodiments, the functionalized biopolymer comprises a plurality of functional side chains including but not limited to hydroxyl groups and carboxylic acid groups. In some embodiments, functional side chains serve as synthetic attachment points allowing for the covalent attachment of additional molecular fragments which can change the properties of the functionalized biopolymer. In some embodiments, the additive is covalently attached to the synthetic attachment points on the functionalized biopolymer.

In some embodiments, the functionalized biopolymer comprises: a plurality of pendent functional side chains of the formula: —$(CX_2)_n$—$CX_3$, wherein each X is independently selected from F, Br, I, Cl, or combinations thereof (such as for example, —$(CF_2)_n$—$CBr_3$ or —$(CBr_2)_n$—$CFCl_2$) and wherein n is an integer from 2 to 18; a plurality of pendent hydroxyl groups of formula —OH; and a plurality of pendent carboxylic acid groups of formula —C(=O)OH.

In some embodiments, n is an integer from 2 to 4. In some embodiments, n is an integer from 4 to 6. In some embodiments, n is an integer from 6 to 8. In some embodiments, n is an integer from 8 to 10. In some embodiments, n is an integer from 10 to 12. In some embodiments, n is an integer from 12 to 14. In some embodiments, n is an integer from 14 to 16. In some embodiments, n is an integer from 16 to 18. In some embodiments, n is 2, 3, 4, 5, 6, 7, 8, 9, 10, 11, 12, 13, 14, 15, 16, 17, 18, or ranges between any two of these values.

In some embodiments, the plurality of functional side chains and a combination of the plurality of pendent hydroxyl groups and the plurality of pendent carboxylic acid groups on the functionalized biopolymer are present in a ratio of about 99 to 1 to about 20 to 80. In some embodiments, the plurality of functional side chains and a combination of the plurality of pendent hydroxyl groups and the plurality of pendent carboxylic acid groups on the functionalized biopolymer are present in a ratio of about 99 to 1 to about 90 to 10. In some embodiments, the plurality of functional side chains and a combination of the plurality of pendent hydroxyl groups and the plurality of pendent carboxylic acid groups on the functionalized biopolymer are present in a ratio of about 99 to 1 to about 80 to 20. In some embodiments, the plurality of functional side chains and a combination of the plurality of pendent hydroxyl groups and the plurality of pendent carboxylic acid groups on the functionalized biopolymer are present in a ratio of about 99 to 1 to about 70 to 30. In some embodiments, the plurality of functional side chains and a combination of the plurality of pendent hydroxyl groups and the plurality of pendent carboxylic acid groups on the functionalized biopolymer are present in a ratio of about 99 to 1 to about 60 to 40. In some embodiments, the plurality of functional side chains and a combination of the plurality of pendent hydroxyl groups and the plurality of pendent carboxylic acid groups on the functionalized biopolymer are present in a ratio of about 99 to 1 to about 50 to 50. In some embodiments, the plurality of functional side chains and a combination of the plurality of pendent hydroxyl groups and the plurality of pendent carboxylic acid groups on the functionalized biopolymer are present in a ratio of about 99 to 1 to about 40 to 60. In some embodiments, the plurality of functional side chains and a combination of the plurality of pendent hydroxyl groups and the plurality of pendent carboxylic acid groups on the functionalized biopolymer are present in a ratio of about 99 to 1 to about 30 to 70. In some embodiments, the functionalized biopolymer is fully substituted so as to consist of only the plurality of pendent functional side chains. In some embodiments, the plurality of pendent functional side chains and a combination of the plurality of pendent hydroxyl groups and the plurality of pendent carboxylic acid groups are present in a ratio from about 99 to 1 to about 95 to 5. In some embodiments, the plurality of pendent functional side chains and a combination of the plurality of pendent hydroxyl groups and the plurality of pendent carboxylic acid groups are present in a ratio from about 95 to 5 to about 90 to 10. In some embodiments, the plurality of pendent functional side chains and a combination of the plurality of pendent hydroxyl groups and the plurality of pendent carboxylic acid groups are present in a ratio from about 90 to 10 to about 85 to 15. In some embodiments, the plurality of pendent functional side chains and a combination of the plurality of pendent hydroxyl groups and the plurality of pendent carboxylic acid groups are present in a ratio from about 85 to 15 to about 80 to 20. In some embodiments, the plurality of pendent functional side chains and a combination of the plurality of pendent hydroxyl groups and the plurality of pendent carboxylic acid groups are present in a ratio from about 80 to 20 to about 99 to 1.

In some embodiments, the ratio of the plurality of pendent functionalized side chains to the combination of a plurality of pendent hydroxyl groups and a plurality of pendent carboxylic acid groups on the functionalized biopolymer depends on the length of the functionalized side chains, wherein longer side chains may have a greater influence on the phase behavior of the functionalized biopolymer than shorter side chains. In some embodiments, a long side chain is characterized by a side chain with a number of carbons being greater than 6 carbons. For example, where the plurality of pendent functional side chains consists of the formula: —$(CF_2)$—$CF_3$, and wherein the functionalized biopolymer is 100% substituted, the phase behavior may be equivalent or lower than where the plurality of pendent functional side chains consists of the formula: —$(CF_2)_{17}$—$CF_3$, and wherein the functionalized biopolymer is 20% substituted.

In some embodiments, the additive is covalently bound to the plurality of pendent hydroxyl groups, the plurality of pendent carboxylic acid groups, or a combination thereof. In some embodiments, the additive is present in a proportion so as to achieve the desired occupancy on the biopolymer for a particular reaction. In some embodiments, the additive is a ligand or catalyst. In some embodiments, the ligand or catalyst is hydroxy substituted, halomethyl substituted, acid chloride substituted, or a combination thereof.

In some embodiments, the organic solvent phase comprises dichlorobenzene, chlorobenzene, toluene, benzene, cyclohexane, 1,4 dioxane, chloroform, hexane, tetrahydrofuran, ethyl acetate, acetone, dimethylformamide, dimethylsulfoxide, or a combination thereof.

In some embodiments, the halogenated solvent is a perfluoroalkane, a perbromoalkane, a perchloroalkane, a periodoalkane, trifluorotoluene, or a combination thereof.

In some embodiments, the halogenated solvent may comprise a solvent that is not fully substituted. For example, in some embodiments trifluorotoluene may be a suitable halogenated solvent. In some embodiments, the halogenated solvent is a perfluoroalkane. Perfluoroalkanes such a perfluorooctane have peculiar solubility characteristics. In some embodiments, they are simultaneously hydrophobic, oleophobic, and fluorophilic, thereby avoiding interaction with water and organic solutions.

In some embodiments, the organic solvent phase and the halogenated solvent phase are immiscible at ambient temperature and pressure.

In some embodiments, the halogenated solvent and the organic solvent are present in a ratio of about 1:1. In some embodiments, the halogenated solvent and the organic solvent are present in a ratio of about 2:1. In some embodiments, the halogenated solvent and the organic solvent are present in a ratio of about 3:1. In some embodiments, the halogenated solvent and the organic solvent are present in a ratio of about 4:1. In some embodiments, the halogenated solvent and the organic solvent are present in a ratio of about 5:1. In some embodiments, the halogenated solvent and the organic solvent are present in a ratio of about 10:1. In some embodiments, the halogenated solvent and the organic solvent are present in a ratio of about 100:1. In some embodiments, the halogenated solvent and the organic solvent are present in a ratio of about 1:2. In some embodiments, the halogenated solvent and the organic solvent are present in a ratio of about 1:3. In some embodiments, the halogenated solvent and the organic solvent are present in a ratio of about 1:4. In some embodiments, the halogenated solvent and the organic solvent are present in a ratio of about 1:5. In some embodiments, the halogenated solvent and the organic solvent are present in a ratio of about 1:10. In some embodiments, the halogenated solvent and the organic solvent are present in a ratio of about 1:100. In some embodiments, the halogenated solvent and the organic solvent are present in a ratio from about 1:1 to about 1:100. In some embodiments, the halogenated solvent and the organic solvent are present in a ratio from about 1:1 to 100:1.

In some embodiments, mixtures of perfluoroalkanes and organic solvents may form two distinct phases at ambient temperature and pressure. Halogenated solvents such as perfluoroalkanes are almost always more dense than organic solvents and they form a distinct lower layer in a vessel such as a flask or separatory funnel. However, in some embodiments, mixtures of halogenated solvents and non-fluorinated organic solvents become one homogenous phase when heated. For illustrative purposes, at room temperature, perfluorooctane (b.p.=103° C., d=1.766 g/mol) and 1,2-dichlorobenzene (b.p.=180° C., d=1.30 g/mol) are immiscible due to the oleophobic, hydrophobic and fluorophilic nature of the perfluorooctane. In some embodiments, the halogenated solvent is perfluorooctane. In some embodiments, the organic solvent is 1,2-dichlorobenzene.

In some embodiments, the functionalized biopolymer and covalently attached additive are present in the halogen solvent phase at ambient temperature and pressure.

In some embodiments, the species of the halogenated solvent may correspond to the species of halogen making up the plurality of functional side chains, for example, where the plurality of pendent functional side chains has the formula: —$(CX_2)_n$—$CX_3$, and wherein each X is F and wherein n is an integer from 2 to 18, then the halogen phase may be a fluorous phase such as perfluoroalkane.

Some embodiments are directed to the synthesis of a functionalized biopolymer for use in a multi-phase biopolymer catalyst support system. Some embodiments are directed to a method of synthesizing a biopolymer material, the method comprising: dissolving a biopolymer in a non-protic polar solvent to form a dissolved biopolymer; contacting the dissolved biopolymer with a compound of the formula HO—$(CX_2)_n$—$CX_3$, wherein each X is an element independently selected from F, Br, I, Cl, or combinations thereof; and wherein n is an integer from 2 to 18. In some embodiments, n is an integer from 2 to 4. In some embodiments, n is an integer from 4 to 6. In some embodiments, n is an integer from 6 to 8. In some embodiments, n is an integer from 8 to 10. In some embodiments, n is an integer from 10 to 12. In some embodiments, n is an integer from 12 to 14. In some embodiments, n is an integer from 14 to 16. In some embodiments, n is an integer from 16 to 18. In some embodiments, n is 2, 3, 4, 5, 6, 7, 8, 9, 10, 11, 12, 13, 14, 15, 16, 17 or 18.

In some embodiments, the biopolymer comprises a plurality of pendent hydroxyl groups of formula: —OH and a plurality of pendent carboxylic acid groups of formula: —C(=O)OH.

In some embodiments, the biopolymer is dissolved prior to contacting with the compound. In some embodiments, the biopolymer is dissolved in a polar aprotic solvent to form a dissolved biopolymer matrix prior to combining with the compound. In some embodiments, the polar aprotic solvent is selected from the group consisting of dimethylsulfoxide, dimethylformamide, dimethylacetamide, N-methyl-2-pyrrolidone, dichloromethane, tetrahydrofuran, ethyl acetate, acetone, acetonitrile, hexamethylphosphoramide, and combinations thereof.

Some embodiments may further comprise adding a proton sponge to the polar aprotic solvent prior to dissolving the biopolymer. In some embodiments, the proton sponge is selected from the group consisting of pyridine, 1,8-bis(dimethylamino)naphthalene, 1,8 bis(hexamethyltriaminophosphazenyl)naphthalene, and combinations thereof.

In some embodiments, the biopolymer is lignin, cellulose, hemicellulose, dextrin, a wood-derived biopolymer, or combinations thereof.

In some embodiments the biopolymer comprises a large natural polymer containing numerous aromatic moieties and hydroxyl groups, extensively cross-linked by ether bonds.

In some embodiments, the biopolymer is lignin. Lignin represents an inexpensive biopolymer that is rich with functional groups made up of phenols and primary and secondary alcohols, as seen in the exemplary generic lignin structure below:

independently an element selected from F, Br, I, Cl, or combinations thereof; and wherein n is an integer from 2 to 18 to form the biopolymer material. In some embodiments, contacting the biopolymer with the compound is performed in the presence of an azodicarboxylate and an organophosphorous compound.

In some embodiments, contacting the biopolymer with compound is carried out for a duration of about 10 minutes to about 48 hours. In some embodiments, contacting the biopolymer with compound is carried out for a duration of about 10 minutes to about 60 minutes. In some embodiments, contacting the biopolymer with compound is carried out for a duration of about 1 to about 6 hours, about 6 to about 12 hours, about 12 to about 18 hours, about 18 to about 24 hours, about 24 hours to about 30 hours, about 30 hours to about 36 hours, about 36 hours to about 42 hours, or about 42 hours to about 48 hours. In some embodiments, contacting the biopolymer with compound is carried out for a duration of about 1 hour, 2 hours, 3 hours, 4 hours, 5 hours or 6 hours.

In some embodiments, contacting the biopolymer with the compound is carried out at a temperature of about −20° C. to about 100° C. In some embodiments, contacting the biopoly-

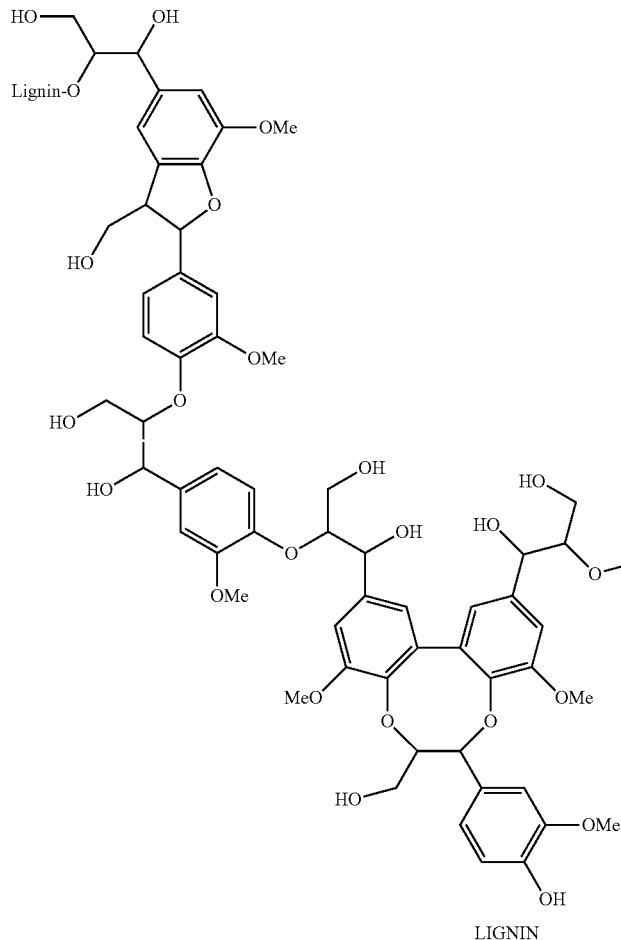
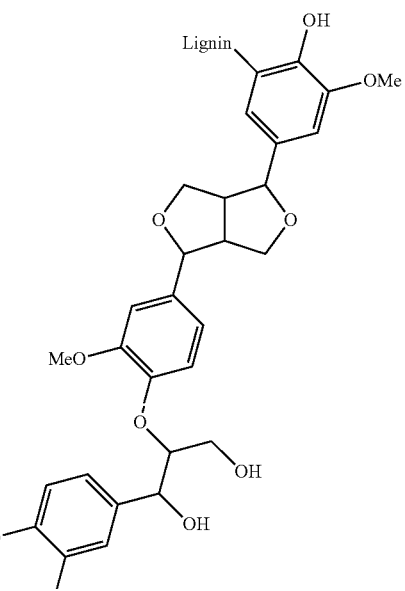

LIGNIN

In some embodiments, lignin has a large number of primary and secondary hydroxyl functional groups along with significant aromatic character, aldehydes and carboxylic acids. In some embodiments, lignin is contacted with a compound of formula HO—(CX$_2$)n—CX$_3$, wherein each X is mer with the compound is carried out at a temperature of about −20° C. to about −10° C., about −10° C. to about 0° C., about 0° C. to about 10° C. about 10° C. to about 20° C., about 20° C. to about 30° C., about 30° C. to about 40° C., about 40° C. to about 50° C., about 50° C. to about 60° C., about 60° C.

to about 70° C., about 70° C. to about 80° C. about 80° C. to about 90° C. or about 90° C. to about 10° C. In some embodiments, contacting the biopolymer with the compound is carried out at a temperature of about −20° C. to about 0° C., about −20° C. to about 20° C., about −20° C. to about 40° C., about −20° C. to about 60° C., about −20° C. to about 80° C., about −20° C. to about 90° C., about −20° C. to about 100° C. In some embodiments, contacting the biopolymer with the compound is carried out at about 0° C. In some embodiments, contacting the biopolymer with the compound is carried out at about 25° C. In some embodiments, contacting the biopolymer with the compound is carried out at a temperature that is lower than the boiling point of the compound, the biopolymer, or a combination thereof.

In some embodiments, contacting the biopolymer with the compound further comprises mixing. In some embodiments, mixing facilitates the formation of a biopolymer material.

In some embodiments, the organophosphorus compound is added to the dissolved biopolymer followed by addition of the azodicarboxylate. In some embodiments, the organophosphorous compound and azodicarboxylate are added to the dissolved biopolymer at the same time.

In some embodiments, the organophosphorous compound is a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane a phosphite, a phosphonite, a phosphinite, a primary phosphine, a secondary phosphine, a phosphoalkane, a phosphoalkyne, or a combination thereof.

In some embodiments, the organophosphorous compound comprises a phosphine. In some embodiments, the organophosphorous compound may comprise dicyclohexylphenylphosphine, diethylphenylphosphine, 4-(dimethylamino) phenyldiphenylphosphine, diphenyl-2-pyridylphosphone, isopropyldiphenylphosphine, tributylphosphine, tri-tert-butylphosphine, tricyclohexylphosphine, trihexylphosphine, triphenylphosphine, tri-n-octylphosphine, 4 diphenylphosphine polystyrene resin, diphenylphosphino polystyrene resin, polystyryldipehnylphosphine, or a combination thereof.

In some embodiments, the organophosphorous compound is bound to a resin. In some embodiments, the resin is an organic polymer resin. In some embodiments the resin is a polystyrene resin. In some embodiments, attachment of the organophosphorous compound to the resin facilitates removal of the organophosphorous compound once the biopolymer material has been formed.

In some embodiments, the resin-bound organophosphorous compound is a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane a phosphite, a phosphonite, a phosphinite, a primary phosphine, a secondary phosphine, a phosphoalkane, a phosphoalkyne, or a combination thereof.

In some embodiments, the resin-bound organophosphorous compound may comprise dicyclohexylphenylphoposphine, diethylphenylphosphine, 4-(dimethylamino)phenyldiphenylphosphine, diphenyl-2-pyridylphosphone, isopropyldiphenylphosphine, tributylphosphine, tri-tert-butylphosphine, tricyclohexylphosphine, trihexylphosphine, triphenylphosphine, tri-n-octylphosphine, 4-diphenylphosphine polystyrene resin, diphenylphosphino polystyrene resin, polystyryldipehnylphosphine, or a combination thereof.

In some embodiments, the azodicarboxylate is diethyl azodicarboxylate (DEAD), diisopropyl azodicarboxylate (DIAD), N,N,N',N',-tetramethylazodicarboxamide, 1,1'-(azidocarbonyl)dipiperidine, dibenzyl azodicarboxylate, diethyl azodicarboxylate, diisopropyl azodicarboxylate, dimethyl azodicarboxylate, or a combination thereof.

In some embodiments, the resin-bound organophosphorous compound is triphenylphosphine. In some embodiments, the resin-bound organophosphorous compound is polystyryldipehnylphosphine. In some embodiments, the azodicarboxylate is diethyl azodicarboxylate. In some embodiments, the resin-bound organophosphorous is triphenylphosphine and the azodicarboxylate is diethyl azodicarboxylate.

In some embodiments, the resulting biopolymer material comprises a plurality of ether and ester functional side chains.

In some embodiments, contacting the dissolved biopolymer with the compound results in the formation of the biopolymer material. In some embodiments, this is accomplished via a condensation-dehydration reaction, with the loss of a water molecule from the pendent hydroxyl, carboxylic acid groups, or combination thereof. In some embodiments, the condensation-dehydration reaction comprises the reaction of hydroxyls and carboxylic acids on the biopolymer in the presence of an azodicarboxylate and an organophosphorous compound.

In some embodiments, the reaction is between a hydroxyl group of a compound of formula $HO-(CX_2)_n-CX_3$, wherein each X is an element independently selected from F, Br, I, Cl, or combinations thereof; and wherein n is an integer from 2 to 18 and a carboxylic acid group, wherein the carboxylic acid group is part of a biopolymer. In some embodiments, the resulting biopolymer material comprises ester functional side chains. In some embodiments, the reaction is between a hydroxyl group of a compound of formula $HO-(CX_2)_n-CX_3$, wherein each X is an element independently selected from F, Br, I, Cl, or combinations thereof; and wherein n is an integer from 2 to 18 and a hydroxyl group, wherein the hydroxyl group is part of a biopolymer. In some embodiments, n is 2, 3, 4, 5, 6, 7, 8, 9, 10, 11, 12, 13, 14, 15, 16, 17, or 18.

In some embodiments, the resulting biopolymer material comprises ether functional side chains. In some embodiments, a compound of formula $HO-(CX_2)_n-CX_3$, wherein each X is an element independently selected from F, Br, I, Cl, or combinations thereof; and wherein n is an integer from 2 to 18 and can react with both the hydroxyl groups and the carboxylic acid groups on the dissolved biopolymer to form a biopolymer material comprising a combination of ether and ester functional side chains. In some embodiments, the remaining unsubstituted hydroxyl and carboxylic acid side chains on the biopolymer serve as attachment points for the catalyst or ligand.

In some embodiments, contacting the dissolved biopolymer with the compound results in substitution of the plurality of pendent hydroxyl groups and the plurality of pendent carboxylic acid groups on the dissolved biopolymer with a functional group of formula $-(CX_2)_n-CX_3$, wherein each X is an element independently selected from F, Br, I, Cl, or combinations thereof; and wherein n is an integer from 2 to 18. In some embodiments, n is an integer from 2 to 4. In some embodiments, n is an integer from 4 to 6. In some embodiments, n is an integer from 6 to 8. In some embodiments, n is an integer from 8 to 10. In some embodiments, n is an integer from 10 to 12. In some embodiments, n is an integer from 12 to 14. In some embodiments, n is an integer from 14 to 16. In some embodiments, n is an integer from 16 to 18. In some embodiments, n is 2, 3, 4, 5, 6, 7, 8, 9, 10, 11, 12, 13, 14, 15, 16, 17, or 18.

In some embodiments, between about 10% to about 99% of the plurality of pendent hydroxyl groups and the plurality of pendent carboxylic acid groups are substituted by the compound. In some embodiments, between about 10% to about 20% of the plurality of pendent hydroxyl groups and the plurality of pendent carboxylic acid groups are substituted by the compound. In some embodiments, between about 10% to about 30% of the plurality of pendent hydroxyl groups and the plurality of pendent carboxylic acid groups are substituted by the compound. In some embodiments, between about 10% to about 40% of the plurality of pendent hydroxyl groups and the plurality of pendent carboxylic acid groups are substituted by the compound. In some embodiments, between about 10% to about 50% of the plurality of pendent hydroxyl groups and the plurality of pendent carboxylic acid groups are substituted by the compound. In some embodiments, between about 10% to about 60% of the plurality of pendent hydroxyl groups and the plurality of pendent carboxylic acid groups are substituted by the compound. In some embodiments, between about 10% to about 70% of the plurality of pendent hydroxyl groups and the plurality of pendent carboxylic acid groups are substituted by the compound. In some embodiments, between about 10% to about 80% of the plurality of pendent hydroxyl groups and the plurality of pendent carboxylic acid groups are substituted by the compound. In some embodiments, between about 10% to about 90% of the plurality of pendent hydroxyl groups and the plurality of pendent carboxylic acid groups are substituted by the compound. In some embodiments, between about 10% to about 99% of the plurality of pendent hydroxyl groups and the plurality of pendent carboxylic acid groups are substituted by the compound. In some embodiments, between about 20% to about 30% of the plurality of pendent hydroxyl groups and the plurality of pendent carboxylic acid groups are substituted by the compound. In some embodiments, between about 30% to about 40% of the plurality of pendent hydroxyl groups and the plurality of pendent carboxylic acid groups are substituted by the compound. In some embodiments, between about 40% to about 50% of the plurality of pendent hydroxyl groups and the plurality of pendent carboxylic acid groups are substituted by the compound. In some embodiments, between about 50% to about 60% of the plurality of pendent hydroxyl groups and the plurality of pendent carboxylic acid groups are substituted by the compound. In some embodiments, between about 60% to about 70% of the plurality of pendent hydroxyl groups and the plurality of pendent carboxylic acid groups are substituted by the compound. In some embodiments, between about 70% to about 80% of the plurality of pendent hydroxyl groups and the plurality of pendent carboxylic acid groups are substituted by the compound. In some embodiments, between about 80% to about 90% of the plurality of pendent hydroxyl groups and the plurality of pendent carboxylic acid groups are substituted by the compound. In some embodiments, between about 90% to about 99% of the plurality of pendent hydroxyl groups and the plurality of pendent carboxylic acid groups are substituted by the compound. In some embodiments, greater than about 99% of the plurality of pendent hydroxyl groups and the plurality of pendent carboxylic acid groups are substituted by the compound.

In some embodiments, NMR analysis of the biopolymer allows for the determination of the relative equivalents of hydroxyl groups and carboxylic acid groups present in a particular batch of biopolymer and this information can be used to determine the number of equivalents of compound to be contacted with the dissolved biopolymer to achieve the desired level of substitution.

In some embodiments, the degree of substitution can be determined by NMR analysis. Aliquots of the reaction can be taken and measured by $^1$H NMR analysis because the longer functional side chains such as a perfluoroalkyl chain will not register a proton signal by $^1$H NMR analysis and replace the hydroxyl signal therefore diminishing signals in the hydroxyl and carboxylic acid regions. In some embodiments, the percentage change in the hydroxyl and carboxylic acid regions is a surrogate for functional side chain substitution. For example, in some embodiments, a 90% decrease in the signal signals in the hydroxyl and carboxylic acid regions is indicative that 90% of the hydroxyl and carboxylic acid side chains have been substituted with functional side chains, leaving 10% of the hydroxyl and carboxylic acid side chains on the biopolymer. In some embodiments, the remaining unsubstituted hydroxyl and carboxylic acid side chains on the biopolymer serve as attachment points for the catalyst or ligand.

In some embodiments, the plurality of functional side chains and a combination of the plurality of pendent hydroxyl groups and the plurality of pendent carboxylic acid groups on the biopolymer material are present in a ratio of about 99 to 1 to about 20 to 80. In some embodiments, the plurality of functional side chains and a combination of the plurality of pendent hydroxyl groups and the plurality of pendent carboxylic acid groups on the biopolymer material are present in a ratio of about 99 to 1 to about 90 to 10. In some embodiments, the plurality of functional side chains and a combination of the plurality of pendent hydroxyl groups and the plurality of pendent carboxylic acid groups on the biopolymer material are present in a ratio of about 99 to 1 to about 80 to 20. In some embodiments, the plurality of functional side chains and a combination of the plurality of pendent hydroxyl groups and the plurality of pendent carboxylic acid groups on the biopolymer material are present in a ratio of about 99 to 1 to about 70 to 30. In some embodiments, the plurality of functional side chains and a combination of the plurality of pendent hydroxyl groups and the plurality of pendent carboxylic acid groups on the biopolymer material are present in a ratio of about 99 to 1 to about 60 to 40. In some embodiments, the plurality of functional side chains and a combination of the plurality of pendent hydroxyl groups and the plurality of pendent carboxylic acid groups on the biopolymer material are present in a ratio of about 99 to 1 to about 50 to 50. In some embodiments, the plurality of functional side chains and a combination of the plurality of pendent hydroxyl groups and the plurality of pendent carboxylic acid groups on the biopolymer material are present in a ratio of about 99 to 1 to about 40 to 60. In some embodiments, the plurality of functional side chains and a combination of the plurality of pendent hydroxyl groups and the plurality of pendent carboxylic acid groups on the biopolymer material are present in a ratio of about 99 to 1 to about 30 to 70. In some embodiments, the biopolymer material is fully substituted so as to consist of only the plurality of pendent functional side chains. In some embodiments, the plurality of pendent functional side chains and a combination of the plurality of pendent hydroxyl groups and the plurality of pendent carboxylic acid groups are present in a ratio from about 99 to 1 to about 80 to 20. In some embodiments, the plurality of pendent functional side chains and a combination of the plurality of pendent hydroxyl groups and the plurality of pendent carboxylic acid groups are present in a ratio from about 99 to 1 to about 95 to 5. In some embodiments, the plurality of pendent functional side chains and a combination of the plurality of pendent hydroxyl groups and the plurality of pendent carboxylic acid groups are present in a ratio from about 95 to 5 to about 90 to 10. In some embodiments, the plurality of pendent functional side chains and a combination of the plurality of pendent hydroxyl groups and the plurality of pendent carboxylic acid groups are present in a ratio from about 90 to 10 to about 85 to 15. In some embodiments, the plurality of pendent functional side chains and a combination of the plurality of pendent hydroxyl groups and the plurality of pendent carboxylic acid groups are present in a ratio from about 85 to 15 to about 80 to 20.

In some embodiments, the ratio of the plurality of pendent functionalized side chains to the combination of a plurality pendent hydroxyl groups and a plurality of pendent carboxylic acid groups on the biopolymer material depends on the length of the functionalized side chains, wherein longer side chains may have a greater influence on the phase behavior than shorter side chains. In some embodiments, a long side chain is characterized by a side chain with a number of carbons being greater than 6 carbons. In some embodiments, phase behavior relates to the miscibility of the halogenated solvent and the organic solvent present in the biopolymer catalyst support system. For example, where the plurality of pendent functional side chains consists of the formula: —(CF$_2$)—CF$_3$, and wherein the biopolymer material is 99% substituted the phase behavior may be equivalent or lower than where the plurality of pendent functional side chains consists of the formula: —(CF$_2$)$_{17}$—CF$_3$, and wherein the biopolymer material is 20% substituted.

In some embodiments, the plurality of functional side chains comprises perfluoroalkanes. In some embodiments, the plurality of functional side chains comprises perfluorooctane.

Some embodiments further comprise decanting the biopolymer material from the resin-bound organophosphorous compound after contacting the dissolved biopolymer with the compound. In some embodiments, the resin-bound organophosphorous compound and the dissolved biopolymer in the non-protic polar solvent form distinct liquid phases allowing for separation by decanting the dissolved biopolymer material contained in the non-protic polar solvent phase.

Some embodiments further comprise allowing the biopolymer material to dry to form a powder. In some embodiments, allowing the biopolymer material to dry comprises exposing the decanted dissolved biopolymer in the non-protic polar solvent to atmospheric air and allowing the non-protic polar solvent to evaporate leaving behind a dehydrated biopolymer material in a powdered form. In some embodiments, traces of the non-protic polar solvent can be removed under high vacuum. In some embodiments, prior to allowing the biopolymer material to dry to form a powder, the biopolymer material may be filtered and washed with a low boiling non solvent such as, for example, methanol, which evaporates easily with air drying. In some embodiments, the biopolymer material is allowed to dry for a period of about 1 to about 3 hours. In some embodiments, the biopolymer material is allowed to dry for a period of about 3 to about 6 hours. In some embodiments, the biopolymer material is allowed to dry for a period of about 6 to about 9 hours. In some embodiments, the biopolymer material is allowed to dry for a period of about 9 to about 12 hours. In some embodiments, the biopolymer material is allowed to dry for a period of about 1, 2, 3, 4, 5, 6, 7, 8, 9, 10, 11, or 12 hours. In some embodiments, the biopolymer material is allowed to dry for a period of about 1 hour.

In some embodiments, the biopolymer material is soluble in halogenated solvents. For example, where the biopolymer material comprises perfluoroalkane functional side chains (—(CF$_2$)$_n$CF$_3$) the biopolymer material may be soluble in a fluorous solvent. In some embodiments, this allows for the biopolymer material to be sequestered in the fluorous solvent phase of the multi-phase biopolymer catalyst support system.

In some embodiments, the remaining unsubstituted hydroxyl and carboxylic acid side chains on the biopolymer material serve as attachment points for the catalyst or ligand. In some embodiments a ligand or catalyst may be covalently attached to the remaining unsubstituted hydroxyl and carboxylic acid side chains on the biopolymer.

Some embodiments further comprise contacting the biopolymer material with a ligand or catalyst to form a biopolymer catalyst wherein the ligand or catalyst is covalently attached to biopolymer material. In some embodiments, the ligand or catalyst further comprises a metal salt wherein the presence of a metal salt results in an activated biopolymer catalyst. In some embodiments, the ligand or catalyst comprises a halomethyl group, an alcohol group, or an acid chloride group. In some embodiments, the ligand or catalyst comprises a monohalomethylated trisubstituted phosphine.

In some embodiments, the ligand or catalyst is covalently bound to the biopolymer material to form a biopolymer catalyst by contacting the biopolymer material with the ligand or catalyst.

In some embodiments, a ligand or catalyst may be hydroxyl substituted. In some embodiments, a hydroxyl substituted ligand or catalyst can be covalently bonded to the biopolymer material via coupling to the unsubstituted hydroxyl and carboxylic acid side chains.

In some embodiments, contacting the biopolymer material with the compound results in the formation of a biopolymer catalyst. In some embodiments, this is accomplished via a condensation-dehydration reaction, with the loss of a water molecule from the unsubstituted pendent hydroxyl, carboxylic acid groups, or combination thereof, on the biopolymer material. In some embodiments, the condensation-dehydration reaction comprises the reaction of hydroxyls and carboxylic acids on the biopolymer in the presence of an azodicarboxylate and an organophosphorous compound.

In some embodiments, a hydroxyl substituted ligand or catalyst is contacted with the biopolymer material. In some embodiments the biopolymer is dissolved in a polar aprotic solvent to form a dissolved biopolymer matrix prior to contacting with the hydroxyl substituted ligand or catalyst. In some embodiments, the polar aprotic solvent is selected from the group consisting of dimethylsulfoxide, dimethylformamide, dimethylacetamide. N-methyl-2-pyrrolidone, dichloromethane, tetrahydrofuran, ethyl acetate, acetone, acetonitrile, hexamethylphosphoramide, and combinations thereof.

Some embodiments may further comprise adding a proton sponge to the polar aprotic solvent prior to dissolving the biopolymer. In some embodiments, the proton sponge is selected from the group consisting of pyridine, 1,8-bis(dimethylamino)naphthalene, 1,8 bis(hexamethyltriaminophosphazenyl)naphthalene, and combinations thereof.

In some embodiments, contacting the biopolymer material with the hydroxy substituted ligand or catalyst is performed in the presence of an azodicarboxylate and an organophosphorous compound.

In some embodiments, contacting the biopolymer material with the hydroxy substituted ligand or catalyst is carried out for a duration of about 1 to about 6 hours. In some embodiments contacting the biopolymer material with the hydroxy substituted ligand or catalyst is carried out for a duration of about 1 to about 3 hours. In some embodiments, contacting the biopolymer material with the hydroxy substituted ligand or catalyst is carried out for a duration of about 3 to about 6 hours. In some embodiments contacting the biopolymer material with the hydroxy substituted ligand or catalyst is carried out for a duration of about 2 to about 3 hours. In some embodiments, contacting the biopolymer material with the hydroxy substituted ligand or catalyst is carried out for a duration of about 1, 2, 3, 4, 5, or 6 hours.

In some embodiments, contacting the biopolymer material with the hydroxy substituted ligand or catalyst is carried out at a temperature of about −20° C. to about 100° C. In some embodiments, contacting the biopolymer with the compound is carried out at a temperature of about −20° C. to about −10° C., about −10° C. to about 0° C., about 0° C. to about 10° C., about 10° C. to about 20° C., about 20° C. to about 30° C., about 30° C. to about 40° C., about 40° C. to about 50° C. about 5° C. to about 60° C., about 60° C. to about 70° C., about 70° C. to about 80° C. about 80° C. to about 90° C. or about 90° C. to about 100° C. In some embodiments, contacting the biopolymer with the compound is carried out at a temperature of about −20° C. to about 0° C., about −20° C. to about 20° C. about −20° C. to about 40° C., about −20° C. to about 60° C., or about −20° C. to about 80° C. In some embodiments, contacting the biopolymer with the compound is carried out at about 0° C. In some embodiments, contacting the biopolymer with the compound is carried out at about 25° C. In some embodiments, contacting the biopolymer with the compound is carried out at a temperature that is lower than the boiling point of the compound, the biopolymer, or a combination thereof.

In some embodiments, contacting the biopolymer with the hydroxy substituted ligand or catalyst further comprises mixing. In some embodiments, mixing facilitates the formation of a modified biopolymer catalyst.

In some embodiments, the organophosphorous compound is added to the dissolved biopolymer material followed by addition of the azodicarboxylate. In some embodiments, the organophosphorous compound and azodicarboxylate are added to the dissolved biopolymer material at the same time.

In some embodiments, the organophosphorous compound is a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane, a phosphite, a phosphonite, a phosphinite, a primary phosphine, a secondary phosphine, a phosphoalkane, a phosphoalkyne, or a combination thereof.

In some embodiments, the organophosphorous compound may comprise dicyclohexylphenylphosphine, diethylphenylphosphine, 4-(dimethylamino)phenyldiphenylphosphine, diphenyl-2-pyridylphosphone, isopropyldiphenylphosphine, tributylphosphine, tri-tert-butylphosphine, tricyclohexylphosphine, trihexylphosphine, triphenylphosphine, tri-n-octylphosphine, 4-diphenylphosphine polystyrene resin, diphenylphosphino polystyrene resin, polystyryldipehnylphosphine, or a combination thereof.

In some embodiments, the organophosphorous compound is bound to a resin. In some embodiments, the resin is an organic polymer resin. In some embodiments, the resin is a polystyrene resin. In some embodiments, attachment of the organophosphorous compound to the resin facilitates removal of the organophosphorous compound once the biopolymer material has been formed.

In some embodiments, the resin-bound organophosphorous compound is a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane, a phosphite, a phosphonite, a phosphinite, a primary phosphine, a secondary phosphine, a phosphoalkane, a phosphoalkyne, or a combination thereof.

In some embodiments, the resin-bound organophosphorous compound may comprise dicyclohexylphenylphosphine, diethylphenylphosphine, 4-(dimethylamino)phenyldiphenylphosphine, diphenyl-2-pyridylphosphone, isopropyldiphenylphosphine, tributylphosphine, tri-tert-butylphosphine, tricyclohexylphosphine, trihexylphosphine, triphenylphosphine, tri-n-octylphosphine, 4-diphenylphosphine polystyrene resin, diphenylphosphino polystyrene resin, polystyryldipehnylphosphine, or a combination thereof.

In some embodiments, the azodicarboxylate is diethyl azodicarboxylate (DEAD), diisopropyl azodicarboxylate (DIAD), N,N,N',N',-tetramethylazodicarboxamide, 1,1'-(azidocarbonyl)dipiperidine, dibenzyl azodicarboxylate, diethyl azodicarboxylate, diisopropyl azodicarboxylate, dimethyl azodicarboxylate, or a combination thereof.

In some embodiments, the reaction is between a hydroxyl group of a ligand or catalyst and an unsubstituted carboxylic acid group, wherein the carboxylic acid group is part of the biopolymer material. In some embodiments, the reaction is between a hydroxyl group of a ligand or catalyst and a hydroxyl group, wherein the hydroxyl group is part of a biopolymer. In some embodiments, the resulting biopolymer catalyst comprises a plurality of ether and ester functional side chains.

In some embodiments, the resulting biopolymer catalyst comprises ether functional side chains. In some embodiments, a hydroxy substituted ligand or catalyst can react with both the hydroxyl groups and the carboxylic acid groups on the dissolved biopolymer material to form a biopolymer catalyst comprising a combination of ether and ester functional side chains.

In some embodiments, contacting the dissolved biopolymer material with the hydroxy substituted ligand or catalyst results in substitution of the plurality of unsubstituted pendent hydroxyl groups and the plurality of unsubstituted pendent carboxylic acid groups on the dissolved biopolymer material with a ligand or catalyst.

In some embodiments, between about 10% to about 99% of the plurality of unsubstituted pendent hydroxyl groups and the plurality of pendent unsubstituted carboxylic acid groups are substituted by the ligand or catalyst. In some embodiments, between about 10% to about 20% of the plurality of pendent unsubstituted hydroxyl groups and the plurality of pendent unsubstituted carboxylic acid groups are substituted by the ligand or catalyst. In some embodiments, between about 10% to about 30% of the plurality of unsubstituted pendent hydroxyl groups and the plurality of pendent unsubstituted carboxylic acid groups are substituted by the ligand or catalyst. In some embodiments, between about 10% to about 40% of the plurality of pendent unsubstituted hydroxyl groups and the plurality of pendent unsubstituted carboxylic acid groups are substituted by the ligand or catalyst. In some embodiments, between about 10% to about 50% of the plurality of pendent unsubstituted hydroxyl groups and the plurality of pendent unsubstituted carboxylic acid groups are substituted by the ligand or catalyst. In some embodiments, between about 10% to about 60% of the plurality of unsubstituted pendent hydroxyl groups and the plurality of unsubstituted pendent carboxylic acid groups are substituted by the ligand or catalyst. In some embodiments, between about 10% to about 70% of the plurality of pendent unsubstituted hydroxyl groups and the plurality of pendent unsubstituted carboxylic acid groups are substituted by the ligand or catalyst. In some embodiments, between about 10% to about 80% of the plurality of pendent unsubstituted hydroxyl groups and the plurality of pendent unsubstituted carboxylic acid groups are substituted by the ligand or catalyst. In some embodiments, between about 10% to about 90% of the plurality of pendent unsubstituted hydroxyl groups and the plurality of pendent unsubstituted carboxylic acid groups are substituted by the ligand or catalyst. In some embodiments, between about 10% to about 99% of the plurality of pendent unsubstituted hydroxyl groups and the plurality of pendent unsubstituted carboxylic acid groups are substituted by the ligand or catalyst. In some embodiments, between about 20% to about 30% of the plurality of pendent unsubstituted hydroxyl groups and the plurality of pendent unsubstituted carboxylic acid groups are substituted by the ligand or catalyst. In some embodiments, between about 30% to about 40% of the plurality of pendent unsubstituted hydroxyl groups and the plurality of pendent unsubstituted carboxylic acid groups are substituted by the ligand or catalyst. In some embodiments, between about 40% to about 50% of the plurality of pendent unsubstituted hydroxyl groups and the plurality of pendent unsubstituted carboxylic acid groups are substituted by the ligand or catalyst. In some embodiments, between about 50% to about 60% of the plurality of pendent unsubstituted hydroxyl groups and the plurality of pendent unsubstituted carboxylic acid groups are substituted by the ligand or catalyst. In some embodiments, between about 60% to about 70% of the plurality of pendent unsubstituted hydroxyl groups and the plurality of pendent unsubstituted carboxylic acid groups are substituted by the ligand or catalyst. In some embodiments, between about 70% to about 80% of the plurality of pendent unsubstituted hydroxyl groups and the plurality of pendent unsubstituted carboxylic acid groups are substituted by the ligand or catalyst. In some embodiments, between about 80% to about 90% of the plurality of pendent unsubstituted hydroxyl groups and the plurality of pendent unsubstituted carboxylic acid groups are substituted by the ligand or catalyst. In some embodiments, between about 90% to about 99% of the plurality of pendent unsubstituted hydroxyl groups and the plurality of pendent unsubstituted carboxylic acid groups are substituted by the ligand or catalyst. In some embodiments, greater than about 99% of the plurality of pendent unsubstituted hydroxyl groups and the plurality of pendent unsubstituted carboxylic acid groups are substituted by the ligand or catalyst.

In some embodiments, NMR analysis of the biopolymer catalyst allows for the determination of the relative equivalents of hydroxyl groups and carboxylic acid groups present in a particular batch of biopolymer catalyst and this information can be used to determine the number of equivalents of compound to be added to achieve the desired level of substitution.

In some embodiments, the degree of substitution can be determined by NMR analysis. Aliquots of the reaction can be taken and measured by $^1$H NMR analysis because the longer functional side chains such as a perfluoroalkyl chain will not register a proton signal by $^1$H NMR analysis and replace the hydroxyl signal, therefore diminishing signals in the hydroxyl and carboxylic acid regions.

In some embodiments, the resulting biopolymer catalyst comprises a plurality of functional side chains including but not limited to hydroxyl groups and carboxylic acid groups. In some embodiments, a proportion of these hydroxyl groups and carboxylic acid groups are substituted with a ligand or catalyst covalently bound to the biopolymer via an ether or ester bond. In some embodiments, the biopolymer catalysts additionally comprises a plurality of pendent functional side chains of the formula: —$(CX_2)_n$—$CX_3$, wherein each X is an element independently selected from F, Br, I, Cl, or combinations thereof, and wherein n is an integer from 2 to 18; a plurality of pendent hydroxyl groups of formula —OH; and a plurality of pendent carboxylic acid groups of formula —C(=O)OH.

In some embodiments, n is an integer from 2 to 4. In some embodiments, n is an integer from 4 to 6. In some embodiments, n is an integer from 6 to 8. In some embodiments, n is an integer from 8 to 10. In some embodiments, n is an integer from 10 to 12. In some embodiments, n is an integer from 12 to 14. In some embodiments, n is an integer from 14 to 16. In some embodiments, n is an integer from 16 to 18.

In some embodiments, the catalyst or ligand comprises a halomethyl group or an acid chloride group.

In some embodiments, a catalyst or ligand comprising a halomethyl group is covalently bonded to the biopolymer material to form a biopolymer catalyst. In some embodiments, a catalyst or ligand comprising a halomethyl group is contacting with the biopolymer to form a biopolymer catalyst. In some embodiments, the halomethyl group is an acyl chloride. In some embodiments, contacting a ligand or catalyst comprising an acyl chloride with the biopolymer material results in the formation of ester bonds between the ligand or catalyst and the biopolymer material. In some embodiments, the ester bonds form between the pendent unsubstituted hydroxyl or carboxylic acid groups on the biopolymer material and the acyl chloride group on the ligand of catalyst.

In some embodiments, the catalyst or ligand comprising a halomethyl group is contacted with a dissolved biopolymer material. In some embodiments, the biopolymer material is dissolved prior to contacting with the catalyst or ligand comprising a halomethyl group. In some embodiments, the biopolymer is dissolved in a polar aprotic solvent to form a dissolved biopolymer matrix prior to combining with the hydroxyl substituted ligand or catalyst. In some embodiments, the polar aprotic solvent is selected from the group consisting of dimethylsulfoxide, dimethylformamide, dimethylacetamide, N-methyl-2-pyrrolidone, dichloromethane, tetrahydrofuran, ethyl acetate, acetone, acetonitrile, hexamethylphosphoramide, and combinations thereof.

Some embodiments may further comprise adding a proton sponge to the polar aprotic solvent prior to dissolving the biopolymer. In some embodiments, the proton sponge is selected from the group consisting of pyridine, 1,8-bis(dimethylamino)naphthalene, 1,8 bis(hexamethyltriaminophosphazenyl)naphthalene, and combinations thereof.

In some embodiments, contacting the catalyst or ligand comprising a halomethyl group with the dissolved biopolymer material may be carried out by adding the catalyst or ligand comprising a halomethyl group to the dissolved biopolymer material.

In some embodiments, the reaction is carried out at a temperature of about −80° C. to about 100° C. In some embodiments, the reaction is carried out at a temperature of about −80° C. to about −70° C., about −70° C. to about −60° C. about −60° C. to about −50° C., about −5° C. to about −4° C., about −40° C. to about −30° C., about −30° C. to about −20° C. about −20° C. to about −10° C., about −10° C. to about 0° C., about 0° C. to about 10° C., about 10° C. to about 20° C., about 20° C. to about 30° C., about 30° C. to about 40° C., 40° C. to about 50° C., about 50° C. to about 60° C., about 60° C. to about 70° C. about 70° C. to about 80° C., about 80° C. to about 90° C., or about 90° C. to about 100° C. In some embodiments, the reaction is carried out at a temperature of about −80° C. to about 0° C. In some embodiments, the reaction is carried out at a temperature of about 0° C. to about 100° C. In some embodiments, the reaction is carried out at about 0° C. In some embodiments, the reaction is carried out at about −78° C. In some embodiments, contacting the biopolymer with the compound is carried out at a temperature that is lower than the boiling point of the compound, the biopolymer, or a combination thereof.

In some embodiments, contacting the catalyst or ligand comprising a halomethyl group with the dissolved biopolymer material may be catalyzed by N,N-diethylethanamine.

In some embodiments, contacting the catalyst or ligand comprising a halomethyl group with the dissolved biopolymer material in the presence of N,N-diethylethanamine may be carried out at about 25° C. In some embodiments, contacting the catalyst or ligand comprising a halomethyl group with the dissolved biopolymer material in the presence of N,N-diethylethanamine may be carried out at about 0° C. In some embodiments, contacting the catalyst or ligand comprising a halomethyl group with the dissolved biopolymer material in the presence of N,N-diethylethanamine may be carried out at a temperature of about 0° C. to about 35° C., about 0° C. to about 5° C., about 0° C. to about 1° C., about 0° C. to about 15° C., about 15° C. to about 20° C., about 20° C. to about 25° C., about 25° C. to about 30° C. or about 30° C. to about 35° C.

In some embodiments, a catalyst or ligand comprising an acid chloride group is covalently bonded to the biopolymer material to form a biopolymer catalyst. In some embodiments, a catalyst or ligand comprising an acid chloride group is contacted with the biopolymer to form a biopolymer catalyst. In some embodiments, the acid chloride group is an acyl chloride. In some embodiments, contacting a ligand or catalyst comprising an acid chloride with the biopolymer material results in the formation of ester bonds between the ligand or catalyst and the biopolymer material. In some embodiments, the ester bonds form between the pendent unsubstituted hydroxyl or carboxylic acid groups on the biopolymer material and the acid chloride group on the ligand of catalyst.

In some embodiments, the catalyst or ligand comprising an acid chloride group is contacted with a dissolved biopolymer material. In some embodiments, the biopolymer material is dissolved prior to contacting with the catalyst or ligand comprising an acid chloride group. In some embodiments, the biopolymer is dissolved in a polar aprotic solvent to form a dissolved biopolymer matrix prior to combining with the hydroxyl substituted ligand or catalyst. In some embodiments, the polar aprotic solvent is selected from the group consisting of dimethylsulfoxide, dimethylformamide, dimethylacetamide, N-methyl-2-pyrrolidone, dichloromethane, tetrahydrofuran, ethyl acetate, acetone, acetonitrile, hexamethylphosphoramide, and combinations thereof.

Some embodiments may further comprise adding a proton sponge to the polar aprotic solvent prior to dissolving the biopolymer. In some embodiments, the proton sponge is selected from the group consisting of pyridine, 1,8-bis(dimethylamino)naphthalene, 1,8 bis(hexamethyltriaminophosphazenyl)naphthalene, and combinations thereof.

In some embodiments, contacting the catalyst or ligand comprising an acid chloride group with the dissolved biopolymer material may be carried out by adding the catalyst or ligand comprising an acid chloride group to the dissolved biopolymer material.

In some embodiments, the reaction is carried out at a temperature of about −80° C. to about 100° C. In some embodiments, the reaction is carried out at a temperature of about −80° C. to about −70° C., about −70° C. to about −60° C., about −60° C. to about −50° C. about −50° C. to about −40° C., about −40° C. to about −30° C., about −30° C. to about −20° C. about −20° C. to about −10° C., about −100° C. to about 0° C., about 0° C. to about 10° C., about 10° C. to about 20° C., about 20° C. to about 30° C. about 30° C. to about 40° C., about 4° C. to about 50° C., about 50° C. to about 60° C., about 60° C. to about 70° C., about 70° C. to about 80° C., about 80° C. to about 90° C. about −90° C. to about 100° C., about −80° C. to about 0° C., or about 0° C. to about 100° C. In some embodiments, the reaction is carried out at about 0° C. In some embodiments, the reaction is carried out at about −78° C. In some embodiments, contacting the biopolymer with the compound is carried out at a temperature that is lower than the boiling point of the compound, the biopolymer, or a combination thereof.

In some embodiments, contacting the catalyst or ligand comprising an acid chloride group with the dissolved biopolymer material may be catalyzed by N,N-diethylethanamine. In some embodiments, contacting the catalyst or ligand comprising a halomethyl group with the dissolved biopolymer material in the presence of N,N-diethylethanamine may be carried out at a temperature of about −80° C. to about 35° C. In some embodiments, contacting the catalyst or ligand comprising a halomethyl group with the dissolved biopolymer material in the presence of N,N-diethylethanamine may be carried out at about 25° C. In some embodiments, contacting the catalyst or ligand comprising a halomethyl group with the dissolved biopolymer material in the presence of N,N-diethylethanamine may be carried out at about 0° C. In some embodiments, contacting the catalyst or ligand comprising a halomethyl group with the dissolved biopolymer material in the presence of N,N-diethylethanamine may be carried out at a temperature of about 0° C. to about 35° C., about 0° C. to about 5° C., about 0° C. to about 10° C., about 0° C. to about 15° C., about 15° C. to about 20° C., about 20° C. to about 25° C., about 25° C. to about 30° C., or about 30° C. to about 35° C. In some embodiments, contacting the catalyst or ligand comprising a halomethyl group with the dissolved biopolymer material in the presence of N,N-diethylethanamine may be carried out at a temperature of about −80° C. to about −70° C., about −70° C. to about −60° C., about −60° C. to about −50° C. about −50° C. to about −40° C., about −40° C. to about −30° C., about −30° C. to about −20° C., about −20° C. to about −10° C., or about −10° C. to about 0° C.

In some embodiments, the biopolymer catalysts described herein may be used in a multiphase biopolymer catalyst support system.

Some embodiments are directed to a method of catalyzing a reaction with a multi-phase biopolymer catalyst support system. In some embodiments, the catalyzed reaction may include but is not limited to a Heck coupling, a Stille coupling, a Suzuki coupling, a Kumada coupling, a sonogashira coupling, a Hagihara coupling, a Cassar coupling or an aryl-aryl coupling. In some embodiments, an example of an aryl-aryl coupling is the coupling of an aryl halide with an unactivated arene.

Some embodiments are directed to a method of catalyzing a reaction with a multi-phase biopolymer catalyst support system, the method comprising: covalently coupling an additive with a functionalized biopolymer; combining the functionalized biopolymer covalently coupled to the additive with a halogenated solvent to create a halogenated solvent phase; adding an organic solvent to form an organic solvent phase, wherein the organic solvent phase and halogenated solvent phase are immiscible at ambient temperature and pressure;

providing a plurality of reaction substrates for the reaction, wherein the reaction substrates are contained in the organic phase; heating the system for a duration of time for the reaction to proceed to a desired yield of reaction product; separating the organic solvent phase from the halogenated solvent phase to obtain the reaction product at the desired yield.

In some embodiments, the functionalized biopolymer is combined with the additive to form a functionalized biopolymer covalently coupled to the additive and subsequently combined with a halogenated solvent to form the halogenated solvent phase. In some embodiments, the organic solvent is subsequently added to the halogenated solvent phase. In some embodiments, the halogenated solvent phase is added to the organic solvent.

In some embodiments, the halogenated solvent phase may be used in multiple reactions. In some embodiments, following separation of the organic solvent phase from the halogenated solvent phase, the halogenated solvent phase is reused and fresh organic solvent is added. In some embodiments, the result is a multi-phase biopolymer catalyst support system comprising a halogenated phase containing a functionalized biopolymer covalently coupled to the additive, wherein the additive is a ligand or catalyst and a solvent phase to which can be added the substrates of a reaction to be catalyzed.

In some embodiments, the functionalized biopolymer comprises: a plurality of pendent functional side chains of the formula: $—(CX_2)_n—CX_3$, wherein each X is an element independently selected from F, Br, L, Cl, or combinations thereof, and wherein n is an integer from 2 to 18; a plurality of pendent hydroxyl groups of formula —OH; and a plurality of pendent carboxylic acid groups of formula —C(=O)OH.

In some embodiments, the plurality of pendent functional side chains and a combination of the plurality of pendent hydroxyl groups and the plurality of pendent carboxylic acid groups are present in a ratio from about 99 to 1 to about 80 to 20. In some embodiments, the plurality of pendent functional side chains and a combination of the plurality of pendent hydroxyl groups and the plurality of pendent carboxylic acid groups are present in a ratio from about 99 to 1 to about 80 to 20, 99 to 1 to about 95 to 5, 95 to 5 to about 90 to 10, 90 to 10 to about 85 to 15, or 85 to 15 to about 80 to 20.

In some embodiments, the plurality of functional side chains comprises perfluoroalkanes. In some embodiments, the plurality of functional side chains comprises perfluorooctane.

In some embodiments, the functionalized biopolymer is lignin, cellulose, hemicellulose, dextrin, a wood-derived biopolymer, or a combination thereof.

In some embodiments, the additive is a catalyst, a ligand, or a combination thereof. In some embodiments, the ligand or catalyst comprises a halomethyl group, a hydroxyl group, or an acid chloride group. In some embodiments, the ligand or catalyst comprises a monohalomethylated trisubstituted phosphine.

In some embodiments, the additive is bound to the plurality of pendent hydroxyl groups, the plurality of pendent carboxylic acid groups, or a combination thereof, on the functionalized biopolymer. In some embodiments, the additive is a ligand or catalyst. In some embodiments, the additive is a hydroxy substituted ligand or catalyst. In some embodiments, the additive is a halomethyl substituted ligand or catalyst. In some embodiments, the additive is an acid chloride substituted ligand or catalyst. In some embodiments, the additive is an acyl chloride substituted ligand or catalyst. In some embodiments, the additive is covalently bound to the functionalized biopolymer. In some embodiments, the additive is covalently bound to the functionalized biopolymer via ester and ether bonds.

In some embodiments, any catalyst or ligand capable of being substituted with a halomethyl, hydroxyl or an acid chloride group without losing its catalytic function may be used to form functionalized biopolymer.

In some embodiments, heating the system induces mixing of the organic solvent phase and the halogen solvent phase allowing the catalyst or ligand to come into contact with the plurality of reaction substrates for the reaction to be catalyzed.

In some embodiments, the desired temperature achieved from heating the system and the duration of heating is determined by the optimal temperature for the catalyzed reaction to proceed efficiently, wherein the desired reaction product is obtained, with minimal decay or degradation of the reaction product. In some embodiments, the desired temperature achieved from heating the system and the duration of heating is determined by the optimal temperature for the catalyzed reaction to proceed efficiently, wherein the desired reaction product is obtained, with minimal decay or degradation of the reaction product in addition to a temperature wherein the organic solvent phase and the halogenated solvent phase become miscible and form a single phase.

In some embodiments, heating the system comprises applying heat to the system to raise the temperature of the system to induce the halogenated solvent phase and the organic solvent phase to form a single miscible phase. In some embodiments, the formation of a miscible solvent phase comprising the organic solvent phase and the halogenated solvent phase brings the plurality of reaction substrates into contact with the catalyst or ligand. In some embodiments, the formation of a miscible solvent phase comprising the organic solvent phase and the halogenated solvent phase may allow the catalyzed reaction to begin.

In some embodiments, heating the system comprises applying heat to the system to raise the temperature of the system to between about 50° C. to about 25° C., about 50° C. to about 70° C., about 70° C. to about 90° C., about 90° C. to about 110° C., about 110° C. to about 130° C., about 130° C. to about 150° C., about 150° C. to about 170° C., about 170° C. to about 190° C., about 190° C. to about 210° C. about 210° C. to about 230° C., or about 230° C. to about 250° C. In some embodiments, heating the system comprises applying heat to the system to raise the temperature of the system to about 80° C., about 50° C., about 60° C., about 70° C., about 90° C., about 100° C., about 110° C., about 120° C., about 130° C., about 140° C., about 150° C., about 160° C. about 170° C., about 180° C., about 190° C., about 200° C. about 210° C., about 220° C., about 230° C. about 240° C., or about 250° C.

In some embodiments, cooling the system comprises allowing the system to return to ambient/room temperature. In some embodiments, cooling the system comprises removing a heat source from the system. In some embodiments, cooling the system results in separation of the organic solvent phase and the halogen solvent phase. In some embodiments, cooling the system results in the organic solvent phase and the halogenated solvent phase to become immiscible.

In some embodiments, the step of separating the organic solvent phase from the halogen solvent phase comprises decanting the organic solvent phase. In some embodiments, the reaction products are contained in the organic solvent phase. In some embodiments, the reaction product is extracted from the organic solvent phase. In some embodiments, the reaction product is extracted by addition of a co-precipitant to precipitate the reaction product, adding a non-solvent to force precipitation, or a combination thereof. In some embodiments, a precipitated reaction product can then be filtered. In some embodiments, wherein the reaction product is partially aqueous, the reaction product can be extracted by liquid-liquid extraction of the organic phase with water to yield the reaction product dissolved in water. In some embodiments, the reaction product dissolved in water is subsequently extracted by evaporation of the water.

In some embodiments, separating the organic solvent phase from the halogenated solvent phase permits the halogenated solvent phase to be re-used in a multi-phase biopolymer catalyst support system by adding fresh organic solvent containing the reaction substrates. In some embodiments, the halogenated solvent phase is discarded.

EXAMPLES

Example 1

Synthesis of a Multi-Phase Biopolymer Catalyst Support System

The first step in the synthesis of a multi-phase biopolymer catalyst support system can involve synthesizing a biopolymer material. This is accomplished by dissolving a biopolymer, wherein the biopolymer comprises a plurality of pendent hydroxyl groups of formula —OH and a plurality of pendent carboxylic acid groups of formula —C(=O)OH in a non-protic polar solvent such as dimethylsulfoxide to form a dissolved biopolymer. Suitable biopolymers include lignin, cellulose, hemicellulose, dextrin or a wood-derived biopolymer. Dissolving the biopolymer is facilitated by mixing the solvent as the biopolymer is added to the non-protic polar solvent.

The dissolved biopolymer is then contacted with a compound of the formula HO—$(CX_2)_n$—$CX_3$, wherein each X is an element independently selected from F, Br, I, Cl, or combinations thereof; and wherein n is an integer from 2 to 18. Contacting the dissolved biopolymer with the compound results in substitution of the plurality of pendent hydroxyl groups and the plurality of pendent carboxylic acid groups on the dissolved biopolymer with a functional group of formula —$(CX_2)_n$—$CX_3$, wherein each X is an element independently selected from F, Br, I, Cl, or combinations thereof; and wherein n is an integer from 2 to 18. The degree of substitution may range from about 10% to about 99% of the plurality of pendent hydroxyl groups and the plurality of pendent carboxylic acid groups on the biopolymer. NMR analysis of the biopolymer allows for the determination of the relative equivalents of hydroxyl groups and carboxylic acid groups present in a particular batch of biopolymer and this information can be used to determine the number of equivalents of compound to be added to achieve the desired level of substitution.

The degree of substitution is maximized by mixing the dissolved biopolymer and the compound. Furthermore, the longer the compound is contacted with the dissolved biopolymer, the greater the degree of substitution that can be expected.

Reacting the compound with the dissolved biopolymer can be performed at room temperature and the desired substitution achieved after about 2 to about 3 hours. The substitution reaction is facilitated by mixing the dissolved biopolymer and the compound.

Contacting the compound with the dissolved biopolymer is performed in the presence of a resin-bound organophosphorous compound and an azodicarboxylate. The resin-bound organophosphorous compound and azodicarboxylate are added to the dissolved biopolymer prior to addition of the compound.

Suitable resin-bound organophosphorous compounds include but are not limited to triphenylphosphine, a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane a phosphite, a phosphonite, a phosphinite, a primary or secondary phosphine, a phosphoalkane, a phosphoalkyne, or a combination thereof.

Suitable azodicarboxylates include but are not limited to diethyl azodicarboxylate (DEAD), or diisopropyl azodicarboxylate (DIAD).

The progress of the formation of the biopolymer material can be monitored by $^1$H NMR to track the progress of the substitution reaction. Once the reaction is complete, the biopolymer material is decanted from the resin-bound organophosphorous compound. Subsequently, the biopolymer material is allowed to dry in atmospheric air to evaporate off any solvent present and to form a powder. The biopolymer material is allowed to dry as described for a period of about 1 to about 12 hours.

The powdered biopolymer material is then reacted with a ligand or catalyst to form a modified biopolymer catalyst wherein the ligand or catalyst is covalently attached to the modified biopolymer material. Suitable types of ligands or catalysts include but are not limited to those comprising a halomethyl group, a hydroxyl group, an acid chloride group, or a metal salt wherein the presence of a metal salt results in an activated biopolymer catalyst.

When the ligand or catalyst comprises a hydroxyl group, the biopolymer material is again dissolved in dimethylsulfoxide and a proton sponge such as pyridine is added. The dimethylsulfoxide is mixed until the biopolymer material is dissolved. Next, a resin-bound organophosphorous compound and an azodicarboxylate are added to the dissolved biopolymer. The resin-bound organophosphorous compound and azodicarboxylate are added to the dissolved biopolymer prior to addition of the hydroxyl containing ligand or catalyst.

Suitable resin-bound organophosphorous compounds include but are not limited to triphenylphosphine, a phosphate ester, a phosphate amide, a phosphonic acid, a phosphonicester, a phosphinic acid, a phosphinic ester, a phosphine oxide, a phosphine imide, a phosphine chalcogenide, a phosphonium salt, a phosphorane, a phosphite, a phosphonite, a phosphinite, a primary or secondary phosphine, a phosphoalkane, a phosphoalkyne, or a combination thereof.

Suitable azodicarboxylates include but are not limited to diethyl azodicarboxylate (DEAD), or diisopropyl azodicarboxylate (DIAD).

The hydroxyl containing ligand or catalyst is then added and the reaction allowed to proceed for about 2 to about 3 hours at room temperature.

The progress of the formation of the biopolymer catalyst can be monitored by $^1$H NMR to track the progress of the substitution reaction. Once the reaction is complete, the modified biopolymer catalyst is decanted from the resin-bound organophosphorous compound. Subsequently, the biopolymer material is allowed to dry in atmospheric air to evaporate off any solvent present and to form a powder. The biopolymer catalyst is allowed to dry as described for a period of about 1 to about 12 hours.

When the ligand or catalyst comprises a halomethyl or acid chloride group then the biopolymer material is again dissolved in dimethylsulfoxide and a proton sponge such as pyridine is added. The dimethylsulfoxide is mixed until the biopolymer material is dissolved. Once the biopolymer has dissolved, the ligand or catalyst is added along with N,N-diethylethanamine and the reaction is allowed to proceed for about 2 to about 3 hours.

The completed biopolymer material may comprises a plurality of pendent functional side chains of the formula: —(CX$_2$)$_n$—CX$_3$, wherein each X is an element independently selected from F, Br, I, Cl, or combinations thereof, and wherein n is an integer from 2 to 18; a plurality of pendent hydroxyl groups of formula —OH; and a plurality of pendent carboxylic acid groups of formula —C(=O)OH, wherein the plurality of functional side chains and a combination of the plurality of pendent hydroxyl groups and the plurality of pendent carboxylic acid groups on the functionalized biopolymer are present in a ratio of about 99 to 1 to about 10 to 90. The ligand or catalyst is covalently bound to the plurality of pendent hydroxyl groups, the plurality of pendent carboxylic acid groups or present on the biopolymer material via ester and ether bonds.

The completed biopolymer material is now added to a halogenated solvent. Suitable halogenated solvents include, but are not limited to, perfluoroalkane, perbromoalkane, perchloroalkane, periodoalkane, or trifluorotoluene to form a halogenated solvent phase. The reaction substrates for the reaction to be catalyzed are combined with the organic solvent prior to its addition to the halogenated solvent.

The synthesis of a multi-phase biopolymer catalyst support system is completed by the addition of an organic solvent to form an organic solvent phase. Suitable organic solvents include but are not limited to dichlorobenzene, chlorobenzene, toluene, benzene, cyclohexane, 1,4 dioxane, chloroform, hexane, tetrahydrofuran, ethyl acetate, acetone, dimethylformamide, or dimethylsulfoxide. The reaction substrates are added to the organic solvent phase prior to addition to the halogenated solvent phase.

At ambient temperature and pressure, the organic solvent phase and the halogenated solvent phase are immiscible keeping the reaction substrates, contained in the organic solvent phase separated from the catalyst or ligand contained in the halogenated solvent phase.

Example 2

Synthesis of a Multi-Phase Perfluoroalkylated Lignin Catalyst Support System

The first step in the synthesis of a multi-phase lignin catalyst support system involves synthesizing perfluoroalkylated lignin. This is accomplished by dissolving powdered lignin in a non-protic polar solvent such as dimethylsulfoxide to form dissolved lignin. A proton sponge such as pyridine can be added to the dimethylsulfoxide prior to dissolving the powdered lignin.

The dissolved lignin is then reacted with C$_4$-C$_{12}$ perfluoroalkanol. Reacting the dissolved biopolymer with the C$_4$-C$_{12}$ perfluoroalkanol results in substitution of the hydroxyl groups and carboxylic acid groups with a C$_4$-C$_{12}$ perfluoroalkyl groups to form perfluoroalkylated lignin. The degree of substitution desired is about 90% to about 95%. NMR analysis of the perfluoroalkylated lignin allows for the determination of the relative equivalents of hydroxyl groups and carboxylic acid groups present in a particular batch of lignin and this information can be used to determine the number of equivalents of C$_4$-C$_{12}$ perfluoroalkanol to be added to achieve about 90% to about 95% substitution. Reacting the C$_4$-C$_{12}$ perfluoroalkanol with the dissolved lignin can be performed at room temperature and the desired substitution achieved after about 2 to about 3 hours. The substitution reaction is facilitated by mixing the dissolved lignin and the C$_4$-C$_{12}$ perfluoroalkanol.

The reaction of the C$_4$-C$_{12}$ perfluoroalkanol with the dissolved lignin is performed in the presence of a resin-bound organophosphorous compound and an azodicarboxylate. The resin-bound organophosphorous compound and azodicarboxylate are added to the dissolved lignin prior to addition of the C$_4$-C$_{12}$ perfluoroalkanol. The reaction is exemplified in the scheme below.

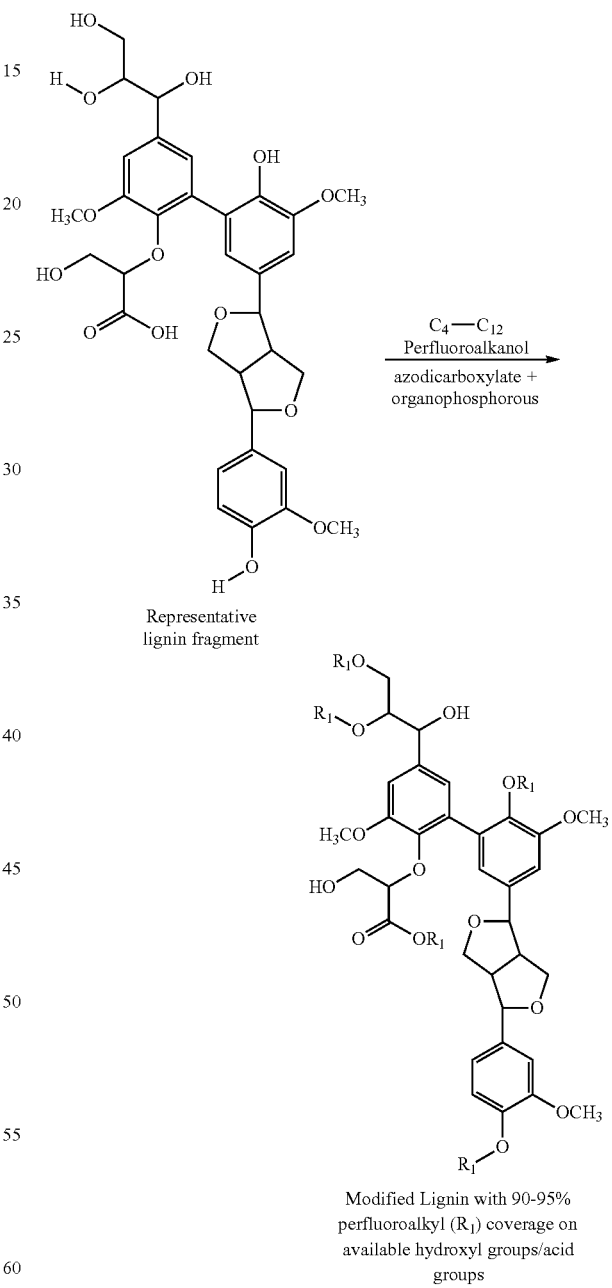

Representative lignin fragment

Modified Lignin with 90-95% perfluoroalkyl (R$_1$) coverage on available hydroxyl groups/acid groups A suitable resin-bound organophosphorous compounds is resin-bound triphenylphosphine, and a suitable azodicarboxylates is diethyl azodicarboxylate (DEAD).

When using DEAD and triphenylphosphine, the reaction of the C$_4$-C$_{12}$ perfluoroalkanol with the dissolved lignin is complete in about 2-3 hours at room temperature. The progress of the reaction can be monitored by $^1$H NMR to track the progress of the substitution reaction. The reaction is continually mixed to ensure the desired substitution of hydroxyl and carboxylic acid groups on the lignin with perfluoroalkylated functional groups.

Once the reaction is complete, the perfluoroalkylated lignin is decanted from the resin-bound triphenylphosphine compound. Subsequently, the perfluoroalkylated lignin is allowed to dry in atmospheric air to evaporate all solvents and form a powder. The perfluoroalkylated lignin is allowed to dry as described for a period of about 1 to about 12 hours.

The powdered perfluoroalkylated lignin is then reacted with a ligand or catalyst to form a modified perfluoroalkylated lignin catalyst wherein the ligand or catalyst is covalently attached to the perfluoroalkylated lignin. Suitable types of ligands or catalysts include but are not limited to a halomethyl group, an alcohol group, an acid chloride group, or a metal salt wherein the presence of a metal salt results in an activated perfluoroalkylated lignin catalyst.

The powdered perfluoroalkylated lignin is then reacted with a ligand or catalyst to form a modified biopolymer catalyst wherein the ligand or catalyst is covalently attached to the perfluoroalkylated lignin. Suitable types of ligands or catalysts include but are not limited to those comprising a halomethyl group, a hydroxyl group, an acid chloride group, or a metal salt wherein the presence of a metal salt results in an activated perfluoroalkylated lignin catalyst.

When the ligand or catalyst comprises a hydroxyl group, the perfluoroalkylated lignin is again dissolved in dimethylsulfoxide and a proton sponge such as pyridine is added. The dimethylsulfoxide is mixed until the perfluoroalkylated lignin is dissolved. Next, a resin-bound organophosphorous compound and an azodicarboxylate are added to the dissolved perfluoroalkylated lignin. The resin-bound organophosphorous compound and azodicarboxylate are added to the dissolved perfluoroalkylated lignin prior to addition of the hydroxyl containing ligand or catalyst.

A suitable resin-bound organophosphorous compound is triphenylphosphine, a suitable azodicarboxylate is diethyl azodicarboxylate (DEAD).

The hydroxyl containing ligand or catalyst is then added and the reaction allowed to proceed for about 2 to about 3 hours at room temperature.

The progress of the formation of the perfluoroalkylated lignin catalyst can be monitored by $^1$H NMR to track the progress of the substitution reaction. Once the reaction is complete, the perfluoroalkylated lignin catalyst is decanted from the resin-bound organophosphorous compound. Subsequently, the perfluoroalkylated lignin catalyst is allowed to dry in atmospheric air to evaporate off any solvent present and to form a powder. The perfluoroalkylated lignin catalyst is allowed to dry as described for a period of about 1 to about 12 hours.

When the ligand or catalyst comprises a halomethyl or acid chloride group then the perfluoroalkylated lignin is again dissolved in dimethylsulfoxide and a proton sponge such as pyridine is added. The dimethylsulfoxide is mixed until the perfluoroalkylated lignin is dissolved. Once the perfluoroalkylated lignin has dissolved, the ligand or catalyst is added along with N,N-diethylethanamine and the reaction is allowed to proceed for about 2 to about 3 hours.

The completed perfluoroalkylated lignin now comprises a plurality of pendent $C_4$-$C_{12}$ perfluoroalkyl side chains; a plurality of pendent hydroxyl groups; and a plurality of pendent carboxylic acid groups of formula —C(═O)OH, wherein the plurality of $C_4$-$C_{12}$ perfluoroalkyl side chains and a combination of the plurality of pendent hydroxyl groups and the plurality of pendent carboxylic acid groups on the functionalized biopolymer are present in a ratio of about 95 to 5 to about 90 to 10. The ligand or catalyst is covalently bound to the plurality of pendent hydroxyl groups, the plurality of pendent carboxylic acid groups or both in the perfluoroalkylated lignin.

The completed perfluoroalkylated lignin is now added to a halogenated solvent such as perfluoroalkane to form a halogenated solvent phase.

The synthesis of a multi-phase perfluoroalkylated lignin catalyst support system is completed by the addition of an organic solvent to form an organic solvent phase. A suitable organic solvent is dichlorobenzene. The reaction substrates are added to the organic solvent phase prior to addition to the halogenated solvent phase.

At ambient temperature and pressure, the organic solvent phase and the halogenated solvent phase are immiscible keeping the reaction substrates, contained in the organic solvent phase separated from the catalyst or ligand contained in the halogenated solvent phase.

Example 3

Catalysis of a Synthetic Chemical Synthesis Reaction Using a Multi-Phase Biopolymer Catalyst Support System A chemical synthesis reaction may be catalyzed using the multi-phase biopolymer catalyst support system of Examples 1 or 2. The reaction substrates for the desired reaction are dissolved in the organic solvent phase and the biopolymer catalyst support is contained the halogenated solvent phase. At ambient temperature and pressure, the organic solvent phase and the halogenated solvent phase are immiscible keeping the reaction substrates contained in the organic solvent phase separated from the catalyst or ligand contained in the halogenated solvent phase.

The first step in the catalysis of the reaction involves heating the system for a duration of time for the reaction to proceed to a desired yield of reaction product. Heating the system allows the organic solvent phase and the halogenated solvent phase to become miscible such that the plurality of reaction substrates come into contact with the catalyst or ligand covalently bound to the biopolymer.

The temperature to which the system is heated is selected based on the boiling point of the halogenated solvent phase and the organic solvent phase such that the two phases become miscible.

Once the reaction has proceeded and a desired yield of reaction product is obtained, the reaction system is cooled to ambient/room temperature to separate the halogenated solvent phase containing the catalyst or ligand from the organic solvent phase containing the reaction product.

Once separated, the organic solvent phase containing the reaction product is decanted from the system and the reaction product can then be extracted from the organic solvent phase.

Example 4

Catalysis of a Synthetic Chemical Synthesis Reaction Using a Multi-Phase Perfluoroalkylated Lignin Catalyst Support System A chemical synthesis reaction may be catalyzed using the multi-phase perfluoroalkylated lignin catalyst support system of Example 2. As described in Example 2, the plurality of reaction substrates is contained the in the organic solvent phase and the catalyst or ligand is contained the halogenated solvent phase. At ambient temperature and pressure, the organic solvent phase and the halogenated solvent phase are immiscible keeping the reaction substrates contained in the organic solvent phase separated from the catalyst or ligand contained in the halogenated solvent phase.

The first step in the catalysis of the reaction involves heating the system for a duration of time for the reaction to proceed to a desired yield of reaction product. Heating the system allows the organic solvent phase and the halogenated solvent phase to become miscible such that the plurality of reaction substrates come into contact with the catalyst or ligand covalently bound to the biopolymer.

The temperature to which the system is heated is selected based on the boiling point of the halogenated solvent phase and the organic solvent phase such that the two phases become miscible.

Once the reaction has proceeded and a desired yield of reaction product is obtained, the reaction system is cooled to ambient/room temperature to separate the halogenated solvent phase containing the catalyst or ligand from the organic solvent phase containing the reaction product.

Once separated, the organic solvent phase containing the reaction product is decanted from the system and the reaction product can then be extracted from the organic solvent phase.

Example 5

Catalysis of Aryl-Aryl Coupling Using a Multi-Phase Perfluoroalkylated Lignin Catalyst Support System Catalysis of the aryl-aryl coupling using a multi-phase perfluoroalkylated lignin catalyst support system is a multi-step process.

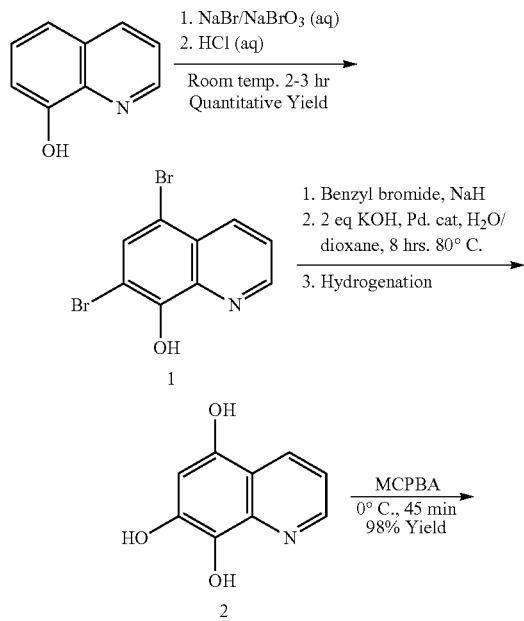

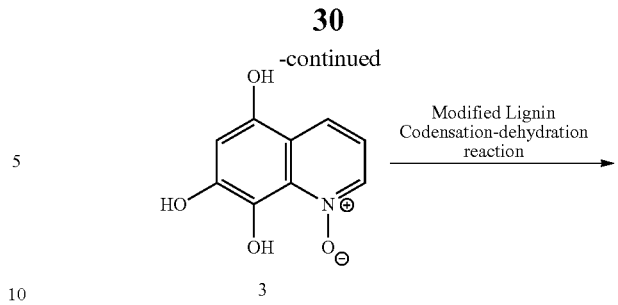

First, quinolin-8-ol, is brominated in the 5 and 7 positions by adding sodium bromide or sodium bromate solution and hydrochloric acid at room temperature to form compound 1. The phenolic hydrogen on compound 1 is first protected with a benzyl ether by the addition of benzyl bromide and sodium hydride. The two bromines on compound 1 are then catalytically hydrolyzed by addition 2 equivalents of potassium hydroxide with a palladium catalyst and water or dioxane. The reaction is then allowed to proceed for about 8 hours at about 80° C. The protecting group on compound 1 is then removed via hydrogenation. Hydrogenation can be achieved by the addition of hydrogen gas in the presence of a palladium catalyst. This three step process results in the formation of compound 2. Compound 2 is then transformed into compound 3 by treatment with meta-chloroperoxybenzoic acid (MCPBA) for 45 minutes at 0° C. Compound 3 represents the completed aryl-aryl coupling catalyst.

The catalyst is then covalently couple to the perfluoroalkylated lignin of example 2. Coupling of compound 3 to the remaining 5-10% free hydroxyl groups and carboxylic acid groups of the perfluoroalkylated lignin of example 2 is accomplished via a condensation-dehydration reaction, with the loss of a water molecule from the pendent hydroxyl, carboxylic acid groups or both to form the multi-phase perfluoroalkylated lignin catalyst. This reaction is performed in the presence of an azodicarboxylate and an organophosphorous compound. A suitable resin-bound organophosphorous compound is triphenylphosphine, and a suitable azodicarboxylate is diethyl azodicarboxylate (DEAD). The substitution of the remaining 5-10% free hydroxyl groups and carboxylic acid groups of the perfluoroalkylated lignin with compound 3 can be carried out at ambient temperature for about 2-3 hours to achieve almost complete substitution.

Due to strong intramolecular hydrogen bonding, the hydroxyl group in the 8 position will likely not participate in the condensation-dehydration reaction, leaving it free to form the six membered chelate with potassium tert-butoxide as required for the aryl-aryl coupling.

The perfluoroalkylated lignin is then allowed to dry in atmospheric air to evaporate any solvents and form a powder. The perfluoroalkylated lignin is allowed to dry as described for a period of about 1 to about 12 hours.

20 mol % loading of the powdered perfluoroalkylated lignin catalyst, is added to a 1:1 mixture of perfluoroctane and chlorobenzene to form the perfluoroalkylated lignin catalyst support system. This is followed by addition of three equivalents of potassium t-butoxide are added along with one equivalent of 4-methyl-1-iodobenzene, or any other iodinated benzene coupling partner and benzene. In addition, the lignin support will be entirely dissolved in the lower, fluorous phase and the chlorobenzene will contain the halogenated aryl coupling partner. Any reaction rate at room temperature will be negligible because of the immiscibility of the two phases. Upon stirring and heating to 80° C. the two liquid phases become one homogeneous phase and the reaction can commence; after 24 hours heating, the reaction vessel is cooled. The formed biaryl product will be immiscible in the fluorous phase and will partition entirely into the upper (organic) solvent layer. The lower, fluorous solvent layer will contain all traces of the active catalyst, which is bound to the fluorophilic lignin support. This fluorous layer can therefore be recycled for another batch of the biaryl synthesis. The organic phase containing the desired product is removed by cannula, dip tube, decantation, and a fresh organic solvent/iodinated coupling partner is added to the reaction vessel. The vessel is then heated to 80° C. with nitrogen purge, beginning a new batch of biaryl production.

In the present disclosure, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein and illustrated in the FIGURE, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations." without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art, all language such as "up to," "at least," and the like include the number recited and refer to ranges which can be subsequently broken down into subranges as discussed above. Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

What is claimed:

1. A multi-phase biopolymer catalyst support system comprising:
   an organic solvent phase comprising: an organic solvent; and
   a halogenated solvent phase comprising: a functionalized biopolymer and an additive,
   wherein the additive comprises:
   a catalyst, a ligand or, a combination thereof,
   wherein the functionalized biopolymer is selected from the group consisting of lignin, cellulose, hemicellulose, dextrin, and a combination thereof,
   wherein the functionalized biopolymer comprises:
   a plurality of pendent functional side chains of the formula:

—(CX$_2$)$_n$—CX$_3$, wherein each X is independently selected from F, Br, I, Cl, or combinations thereof, and wherein n is an integer from 2 to 18; and
   a plurality of pendent carboxylic acid groups of formula —C(=O)OH.

2. The multi-phase biopolymer catalyst support system of claim 1, wherein the organic solvent phase comprises an organic solvent selected from the group consisting of: dichlorobenzene, chlorobenzene, toluene, benzene, cyclohexane, 1,4-dioxane, chloroform, hexane, tetrahydrofuran, ethyl acetate, acetone, dimethylformamide, dimethylsulfoxide, or a combination thereof.

3. The multi-phase biopolymer catalyst support system of claim 1, wherein the halogenated solvent is a perfluoroalkane, a perbromoalkane, a perchloroalkane, a periodoalkane, trifluorotoluene, or a combination thereof.

4. The multi-phase biopolymer catalyst support system of claim 1, wherein the organic solvent phase and the halogenated solvent phase are immiscible at ambient temperature and pressure.

5. The multi-phase biopolymer catalyst support system of claim 1, wherein the functionalized biopolymer is a powder.

6. The multi-phase biopolymer catalyst support system of claim 1, further comprises a resin-bound organophosphorous compound and an azodicarboxylate.

* * * * *

UNITED STATES PATENT AND TRADEMARK OFFICE
CERTIFICATE OF CORRECTION

PATENT NO. : 9,221,040 B2
APPLICATION NO. : 13/579485
DATED : December 29, 2015
INVENTOR(S) : Brizius Page 1 of 1

It is certified that error appears in the above-identified patent and that said Letters Patent is hereby corrected as shown below:

In the Specification

In Column 1, Lines 8-9, delete "under 35 U.S.C. §371" and insert -- under 35 U.S.C. § 371 --, therefor.

In Column 9, Line 2, delete "about 10° C." and insert -- about 100° C. --, therefor.

In Column 9, Lines 39-40, delete "4 diphenylphosphine" and insert -- 4-diphenylphosphine --, therefor.

In Column 15, Lines 18-19, delete "about 50° C. about 5° C." and insert
-- about 50° C. about 50° C. --, therefor.

In Column 19, Line 24, delete "about 1° C., about 0° C." and insert -- about 10° C., about 0° C. --, therefor.

In Column 21, Line 29, delete "F, Br, L, Cl," and insert -- F, Br, I, Cl, --, therefor.

In Column 32, Line 18, delete "(e.g. the" and insert -- (e.g., the --, therefor.

In Column 32, Line 24, delete "(e.g. "a system" and insert -- (e.g., "a system --, therefor.

Signed and Sealed this
Fourteenth Day of June, 2016

Michelle K. Lee
*Director of the United States Patent and Trademark Office*